(12) United States Patent
Kishima

(10) Patent No.: US 7,027,687 B2
(45) Date of Patent: Apr. 11, 2006

(54) OPTICAL COUPLING DEVICE

(75) Inventor: Koichiro Kishima, Kanagawa (JP)

(73) Assignee: Sony Corporation, (JP)

( * ) Notice: Subject to any disclaimer, the term of this patent is extended or adjusted under 35 U.S.C. 154(b) by 648 days.

(21) Appl. No.: 10/067,347

(22) Filed: Feb. 7, 2002

(65) Prior Publication Data

US 2002/0110323 A1   Aug. 15, 2002

(30) Foreign Application Priority Data

Feb. 13, 2001   (JP)   ............................ P2001-035827

(51) Int. Cl.
   *G02B 6/32*   (2006.01)
(52) U.S. Cl. .......................... 385/33; 385/31
(58) Field of Classification Search ................ 385/33, 385/31, 34, 35
   See application file for complete search history.

(56) References Cited

U.S. PATENT DOCUMENTS

| | | | |
|---|---|---|---|
| 3,532,038 A | | 10/1970 | Rottmann |
| 5,073,041 A | * | 12/1991 | Rastani ........................ 385/33 |
| 5,316,640 A | * | 5/1994 | Wakabayashi et al. . 204/192.34 |
| 5,768,456 A | * | 6/1998 | Knapp et al. ................. 385/49 |
| 5,790,730 A | * | 8/1998 | Kravitz et al. ................ 385/49 |
| 5,857,042 A | * | 1/1999 | Robertson et al. ............ 385/33 |
| 5,859,945 A | * | 1/1999 | Kato et al. .................... 385/89 |
| 6,324,149 B1 | | 11/2001 | Mifune et al. |
| 6,434,297 B1 | * | 8/2002 | Althaus et al. ................ 385/33 |

FOREIGN PATENT DOCUMENTS

| | | |
|---|---|---|
| JP | 58171014 A  * | 10/1983 |
| JP | 2000-221305 | 8/2000 |

* cited by examiner

*Primary Examiner*—Sung Pak
(74) *Attorney, Agent, or Firm*—Rader, Fishman & Grauer PLLC; Ronald P. Kananen

(57) ABSTRACT

An optical coupling device capable of reducing a production cost thereof and enhancing a utilization factor of light is provided. The optical coupling device includes: a light outgoing member, having an array of a plurality of light outgoing portions, for allowing light to go out of each of the light outgoing portions; a light incoming member having a plurality of light incoming portions arrayed so as to correspond to the light outgoing portions; and an optical lens array having a plurality of optical lens portions arrayed on a lens substrate so as to correspond to the light outgoing portions, wherein a light ray having gone out of each light outgoing portion is coupled to the corresponding light incoming portion by the optical lens array. As one example, the light outgoing member is a light emitting device array and the light incoming member is an array of optical fibers. As another example, the light outgoing member is an array of optical fibers and the light incoming member is a light receiving device array. As a further example, part of each of the light outgoing member and light incoming member is an array of optical fibers and the rest thereof is a light-emitting/light-receiving device array.

30 Claims, 20 Drawing Sheets

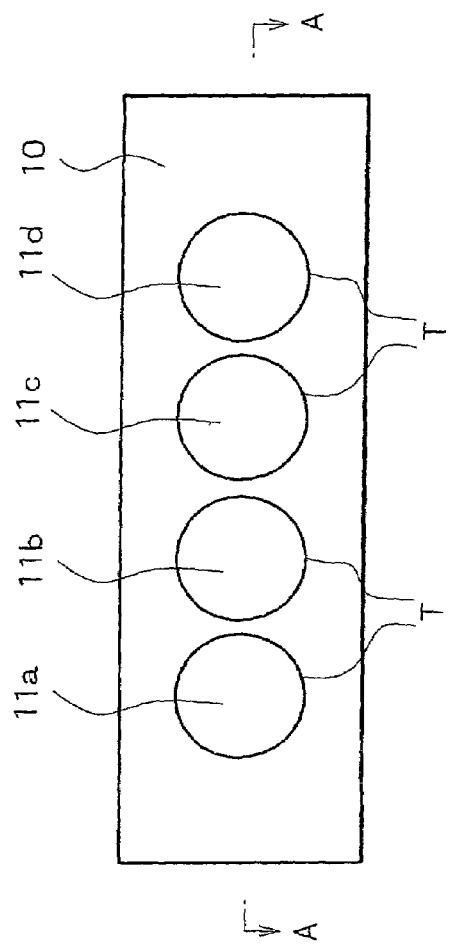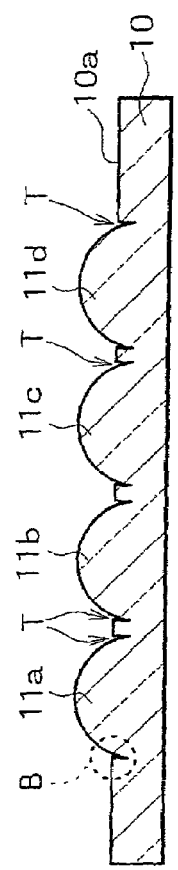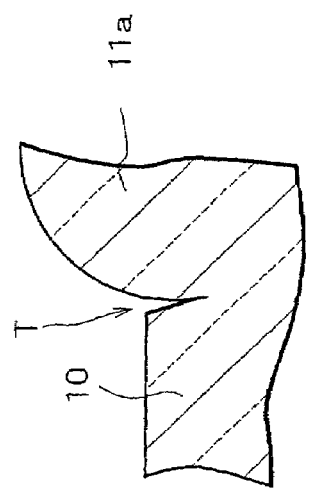
FIG. 2A
FIG. 2B
FIG. 2C

FIG. 16
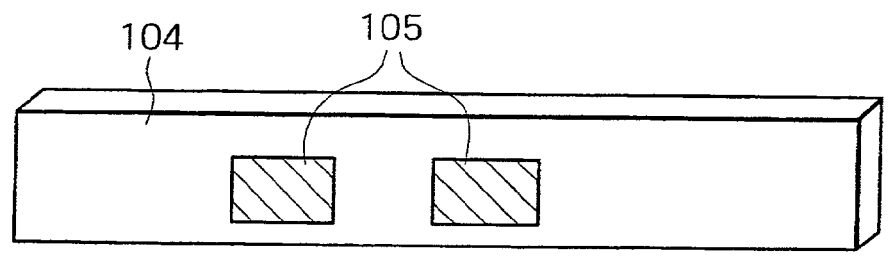
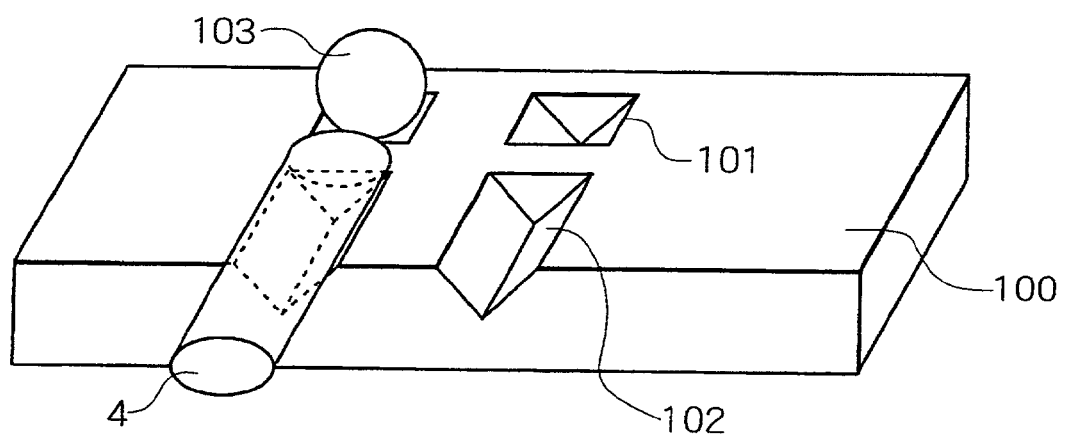

OPTICAL COUPLING DEVICE

BACKGROUND OF THE INVENTION

The present invention relates to an optical coupling device, and particularly to an optical coupling device for coupling light, which has gone out of a light outgoing member, to a light incoming member by means of an optical lens.

Along with the recent progress of information-oriented society, the field of optical communication has been rapidly developing.

In the field of optical communication, rapid development toward higher functions such as higher transfer rate or higher multiplexing of data has been realized.

To realize widespread optical communication to ordinary homes, that is, to realize a broad band network, costs in the field of optical communication must be reduced.

Optical fibers are mainly classified into two categories: expensive glass made optical fibers allowing long-distance transmission of signals at a high transfer rate with less deterioration of signals, and inexpensive plastic made optical fibers (POF) allowing only short-distance transmission of signals.

The reason why the cost of optical fibers is high at the present time is not only due to the fact that the cost of high performance glass made optical fibers is high, but also due to the fact that the cost of mounting optical fibers is high.

FIG. 16 is a perspective view showing a configuration of a related art optical coupling device for mounting optical fibers.

An optical fiber mounting substrate 100 has recesses 101 for lenses and grooves 102 for optical fibers. A ball-shaped lens 103 is disposed in each of the recesses 101 and an optical fiber 4 is disposed in each of the grooves 102. With this configuration, optical coupling is made between an optical device plane 105 of each of the light emitting devices or light receiving devices provided on an optical device substrate 104 and the corresponding one of the optical fibers 4.

In the above-described optical coupling device, since the ball-shaped lenses 103 are used as the optical lenses, the optical fibers 4 and the optical device planes 105 can be easily positioned to each other via the ball-shaped lenses 103; however, since the ball-shaped lenses 103 are not easy to handle, the recesses 101 for lenses are required to be previously provided in the optical fiber mounting substrate 100.

The optical fiber mounting substrate 100, with the recesses 101 and the grooves 102, is to be provided with an expensive anisotropically etchable substrate, for example, a silicon substrate. The use of such an expensive substrate is one reason why the cost of mounting optical fibers is rising.

To reduce the above-described mounting cost of optical fibers, there have been known optical coupling devices using no ball-shaped lenses; however, these optical coupling devices have other problems.

FIG. 17 is a typical view showing a schematic configuration of an optical coupling device for optically coupling an optical fiber to a light emitting device such as a semiconductor laser, a light emitting diode, or a plane emission type semiconductor laser by using an optical lens formed by a diffusion method characterized by diffusing a specific element into an optical lens material.

Referring to FIG. 17, there is shown an optical coupling device configured such that a light emitting device 2a, an optical lens 1a, and an optical fiber 4 are disposed at specific positions. The light emitting device 2a includes a light emitting device substrate 20 and a light emitting portion, for example, a light emitting diode portion 22 provided on the light emitting device substrate 20. The light emitting diode portion 22 may be replaced with a semiconductor laser portion or a plane emission type semiconductor laser portion. The optical lens 1a includes a lens substrate 10 and a convex portion 11 functioning as an optical lens formed on the lens substrate 10 by the above-described diffusion method. The optical fiber 4 includes a core portion 40 and a cladding portion 41 provided around an outer peripheral portion of the core portion 40.

A light ray L, which has gone out of the light emitting diode portion 22 of the light emitting device 2a, is coupled to a light incoming portion located at an end face of the optical fiber 4 by means of the optical lens portion 11.

In the case of using the convex portion 11 formed by the diffusion method as the optical lens, since an increased rate of a refractive index of the convex portion is generally small, it is difficult to obtain an optical lens having a high numerical aperture (NA).

For example, in the case of forming a convex portion by diffusing titanium (Ti) into a substrate made from lithium niobate, since an increased rate of a refractive index is about 4%, an NA of an optical lens composed of the convex portion becomes as small as about 0.1.

Accordingly, in order to project light, which has gone out of the light emitting diode portion 22 of the light emitting device 2a, to the light incoming portion located at the end face of the optical fiber 4, as shown in FIG. 17, a distance between the light emitting diode portion 22 and the optical lens must be extended, with a result that only part of the light having gone out of the light emitting diode portion 22 can be converged. That is to say, of all of the light rays $L_w$ shown by broken lines, only part of the light rays $L_W$, that is, light rays L shown by solid lines can be effectively used.

In this case, since it is required to suppress crosstalk of signals caused by incidence of part of the light, which has not been converged by the optical lens, on the adjacent optical fiber, it is required to absorb such part of the light by forming a light absorbing mask AM having apertures in the optical path.

As a result, in the case of using such an optical lens having a low NA, it is impossible to effectively use light emerged from an optical fiber.

FIG. 18 is a typical view showing a schematic configuration of an optical coupling device for optically coupling an optical fiber to a light emitting device such as a semiconductor laser, a light emitting diode, or a plane emission type semiconductor laser without using an optical lens.

Referring to FIG. 18, there is shown an optical coupling device configured such that a light emitting device array 2 and a plurality of optical fibers 4a and 4b are disposed at specific positions. The light emitting device array 2 includes a light emitting device substrate 20, and a plurality of light emitting portions, for example, light emitting diode portions 22a and 22b. The light emitting diode portions may be replaced with semiconductor laser portions or plane emission type semiconductor laser portions. Each of the optical fibers 4a and 4b includes a core portion 40 and a cladding portion 41 provided around an outer peripheral portion of the core portion 40. A light ray L, which has gone out of each of the light emitting diode portions 22a and 22b of the light emitting device array 2, is coupled to a light incoming portion located at an end face of the corresponding one of the optical fibers 4a and 4b.

In this case, since the light ray, which has gone out of each of the light emitting diodes 22a and 22b, has an extension angle, a reflected light ray $L_R$ from the end face of the corresponding one of the optical fibers 4a and 4b is possibly made incident on one or more optical fibers adjacent thereto, thereby causing crosstalk of signals, and making it difficult to enhance an utilization factor of light.

On the other hand, even in the case of disposing optical fibers on the light outgoing side, there arises a problem similar to that described above.

FIG. 19 is a typical view showing a schematic configuration of an optical coupling device for optically coupling an optical fiber to a light receiving device such as a photodiode by using an optical lens formed by the diffusion method.

Referring to FIG. 19, there is shown an optical coupling device configured such that a light receiving device 5a, an optical lens 1a, and an optical fiber 4 are disposed at specific positions. The light receiving device 5a includes a light receiving device substrate 50 and a light receiving portion such as a photodiode portion 51 provided on the light receiving device substrate 50. The optical lens 1a includes a lens substrate 10 and a convex portion 11 functioning as an optical lens formed on the lens substrate 10 by the diffusion method. The optical fiber 4 includes a core portion 40 and a cladding portion 41 provided around an outer peripheral portion of the core portion 40.

A light ray L, which has gone out of a light outgoing portion located at an end face of the optical fiber 4, is coupled to the photodiode portion 51 of the light receiving device 5a.

As described above, since the NA of the optical lens formed by the diffusion method is small, to project light having gone out of the optical fiber 4 to the photodiode portion 51 of the light receiving portion 5a, a distance between the optical fiber 4 and the optical lens must be extended, with a result that only part of the light having gone out of the optical fiber 4 can be converged by the optical lens as shown in FIG. 19. That is to say, of all of the light rays $L_w$ shown by broken lines, only part of the light rays $L_w$, that is, light rays L shown by solid lines can be used. In this case, since it is required to suppress crosstalk of signals caused by incidence of part of the light, which has not been converged by the optical lens, on the adjacent optical fiber, it is required to absorb such part of the light by forming a light absorbing mask AM having apertures in an optical path.

As a result, as described above, in the case of using such an optical lens having a low NA, it is impossible to effectively use light emerged from an optical fiber.

FIG. 20 is a typical view showing a schematic configuration of an optical coupling device for optically coupling an optical fiber to a light receiving device such as a photodiode.

Referring to FIG. 20, there is shown an optical coupling device configured such that a light receiving device array 5 and a plurality of optical fibers 4a and 4b are disposed at specific positions. The light receiving device array 5 includes a light receiving device substrate 50 and a plurality of light receiving portions such as photodiode portions 51a and 51b provided on the light receiving device substrate 50. Each of the optical fibers 4a and 4b include a core portion 40 and a cladding portion 41 provided around an outer peripheral portion of the core portion 40. A light ray L, which has gone out of a light outgoing portion located at an end face of each of the optical fibers 4a and 4b, is coupled to the corresponding one of the photodiode portions 51a and 51b of the light receiving device array 5.

In this case, since the light, which has gone out of the end face of each of the optical fibers 4a and 4b, has an extension angle, a reflected light ray $L_R$ from the corresponding one of the photodiode portions 51a and 51b is possibly incident on one or more optical fibers and/or the light receiving portions adjacent thereto, thereby causing crosstalk of signals, and making it difficult to enhance an utilization factor of light.

SUMMARY OF THE INVENTION

An object of the present invention is to provide an optical coupling device capable of reducing a production cost of the optical coupling device and enhancing a utilization factor of light.

To achieve the above object, according to one aspect of the present invention, there is provided an optical coupling device including: a light outgoing member, having an array of a plurality of light outgoing portions, for allowing light to go out of each of the plurality of light outgoing portions; a light incoming member having a plurality of light incoming portions arrayed in such a manner as to correspond to the light outgoing portions; and an optical lens array having a lens substrate made from an optical material and a plurality of optical lens portions arrayed on the lens substrate in such a manner as to correspond to the light outgoing portions; wherein a light ray, which has gone out of each of the light outgoing portions of the light outgoing member, is coupled to the corresponding one of the light incoming portions of the light incoming member by the optical lens array.

The light incoming member is preferably an array of a plurality of optical fibers, and the light outgoing member is preferably a light emitting device array having an array of a plurality of light emitting portions.

The light emitting device array is preferably formed by arraying the light emitting portions on a light emitting device substrate.

The light emitting portions are preferably arrayed in line, the optical fibers are preferably arrayed in line, and the optical lens portions are preferably arrayed in line.

The light emitting portions are preferably arrayed in lines, the optical fibers are preferably arrayed in lines, and the optical lens portions are preferably arrayed in lines.

The optical fibers are preferably arrayed in such a manner that outer peripheral portions of two adjacent optical fibers are in contact with each other.

The light emitting device array is preferably a semiconductor laser array.

The light emitting portions are preferably two-dimensionally arrayed, the optical fibers are preferably two-dimensionally arrayed, and the optical lens portions are preferably two-dimensionally arrayed.

The light emitting device array is preferably a light emitting diode array.

The light emitting device array is preferably a plane emission type semiconductor laser array.

Each of the optical lens portions of the optical lens array is preferably formed into a convex shape on the lens substrate.

A light absorber having apertures is preferably formed on the lens substrate of the optical lens array.

The optical lens array is preferably formed by arraying the optical lens portions on a flat surface of the lens substrate.

A groove is preferably formed, in the optical lens array, at a boundary between each of the convex-shaped optical lens portions and the flat surface of the lens substrate.

The light outgoing member is preferably an array of a plurality of optical fibers, and the light incoming member is preferably a light receiving device array having an array of a plurality of light receiving portions.

The light receiving device array is preferably formed by arraying the light receiving portions on a light receiving device substrate.

The optical fibers are preferably arrayed in line, the light receiving portions are preferably arrayed in line, and the optical lens portions are preferably arrayed in line.

The optical fibers are preferably arrayed in lines, the light receiving portions are preferably arrayed in lines, and the optical lens portions are preferably arrayed in lines.

The optical fibers are preferably arrayed in such a manner that outer peripheral portions thereof are in contact with each other.

The optical fibers are preferably two-dimensionally arrayed, the light receiving portions are preferably two-dimensionally arrayed, and the optical lens portions are preferably two-dimensionally arrayed.

The light receiving device array is preferably a photodiode array.

Each of the optical lens portions of the optical lens array is preferably formed into a convex shape on the lens substrate.

A light absorber having apertures is preferably formed on the lens substrate of the optical lens array.

The optical lens array is preferably formed by arraying the optical lens portions on a flat surface of the lens substrate.

A groove is preferably formed, in the optical lens array, at a boundary between each of the convex-shaped optical lens portions and the flat surface of the lens substrate.

Part of each of the light incoming member and the light outgoing member is preferably an array of a plurality of optical fibers; the rest of the light outgoing member is preferably a light emitting device array having an array of a plurality of light emitting portions and the rest of the light incoming member is preferably a light receiving device array having an array of a plurality of light receiving portions.

The light emitting portions of the light emitting device array, as the rest of the light outgoing member, and the light receiving portions of the light receiving device array, as the rest of the light incoming member, are preferably arrayed on the same device substrate.

The light emitting portions and the light receiving portions are preferably arrayed in line, the optical fibers are preferably arrayed in line, and the optical lens portions are preferably arrayed in line.

The light emitting portions and the light receiving portions are preferably arrayed in lines, the optical fibers are preferably arrayed in lines, and the optical lens portions are preferably arrayed in lines.

The optical fibers are preferably arrayed in such a manner that outer peripheral portions thereof are in contact with each other.

The light emitting portions and the light receiving portions are preferably two-dimensionally arrayed, the optical fibers are preferably two-dimensionally arrayed, and the optical lens portions are preferably two-dimensionally arrayed.

The light receiving device array is preferably a photodiode array.

The light receiving device array is preferably a plane emission type semiconductor laser array.

The light receiving device array is preferably a photodiode array.

Each of the optical lens portions of the optical lens array is preferably formed into a convex-shape on the lens substrate.

A light absorber having apertures is preferably formed on the lens substrate of the optical lens array.

The optical lens array is preferably formed by arraying the optical lens portions on a flat surface of the lens substrate.

A groove is preferably formed, in the optical lens array, at a boundary between each of the convex-shaped optical lens portions and the flat surface of the lens substrate.

The plurality of optical lens portions of the optical lens array are preferably formed by a manner of forming a plurality of mask layer portions, which have a pattern corresponding to a specific array pattern of the plurality of optical lens portions and also have shapes corresponding to shapes of the plurality of optical lens portions, on a lens substrate made from an optical material, and simultaneously removing the mask layer portions and part of the lens substrate by etching, to transfer the shapes of the mask layer portions to the lens substrate.

The plurality of mask layer portions are preferably subjected, before etching, to a treatment in which the shape of each of the mask layer portions is deformed in such a manner that a surface area thereof is reduced.

The treatment for deforming the shape of each of the mask layer portions is preferably a heat-treatment.

The plurality of mask layer portions are preferably obtained by forming a mask layer made from a photosensitive material and patterning the mask layer into the plurality of mask layer portions by exposure and development.

The heat-treatment is preferably performed at a temperature higher than a glass-transition temperature of a material for forming the mask layer portions.

The heat-treatment is preferably performed at a temperature lower than a carbonization temperature of a material for forming the mask layer portions.

The heat-treatment is preferably performed at a temperature higher than room temperature which is a temperature required for reserving a material for forming the mask layer portions.

The etching for simultaneously removing the mask layer portions and part of the lens substrate is preferably dry etching.

As described above, according to the optical coupling device of the present invention, a light ray, which has gone out of each of a plurality of light outgoing portions of a light outgoing member, is coupled to the corresponding one of a plurality of light incoming portions of a light incoming member by means of an optical lens array including a lens substrate made from an optical material and a plurality of optical lens portions arrayed on the lens substrate in such a manner as to correspond to the light outgoing portions of the light outgoing member.

Accordingly, it is possible to reduce the number of parts of the optical coupling device by using the optical lens array and hence to reduce the production cost of the optical coupling device. In particular, since the optical coupling device makes use of the high NA optical lens array formed by the manner of forming mask layer portions having a specific pattern on the lens substrate, deforming each of the mask layer portions while reducing the surface area thereof by heat-treatment, and simultaneously removing the mask layer portions and part of the lens substrate by etching, it is possible to enhance the utilization factor of light.

The present invention configured as described exhibits the following effects:

(1) Since the optical coupling device of the present invention can transmit signals to a plurality of optical fibers or receive signals from a plurality of optical fibers by a configuration with less number of parts, it is possible to reduce the production cost of the optical coupling device. Such an optical coupling device is suitable for transmission of broad band data.

(2) Since the optical coupling device uses an optical lens array including an array of a plurality of optical lenses each of which has a high NA and a high light convergence efficiency, it is possible to enhance a utilization factor of light. Accordingly, it is possible to miniaturize the optical coupling device, and since the number of optical fibers can be easily increased, it is possible to increase an amount of data per unit volume of the optical coupling device.

(3) Since an array of optical lenses is determined by a photomask used at the time of production of the optical lenses, it is possible to facilitate mounting of the optical lenses, and since an optical lens array is configured such that a plurality of convex portions functioning as optical lenses are provided on one lens substrate, it is possible to reduce the number of parts and to facilitate mounting of the optical lenses, for example, facilitate an alignment step. Since optical lenses can be arrayed by exposure and development in the same manner as that used for arraying a plurality of light emitting devices or light receiving devices, it is possible to easily align the optical lenses to the plurality of light emitting devices or light receiving devices.

(4) Since optical lenses are produced by the step capable of producing a plurality of optical lenses having uniform optical characteristics, it is possible to facilitate angular alignment between a substrate provided with the optical lenses and a substrate provided with light emitting devices or the light receiving devices.

(5) In the case of using light emitting diodes as light emitting devices of an optical coupling device for optically coupling the light emitting devices to optical fibers, it is possible to particularly reduce the production cost of the optical coupling device.

(6) Since optical coupling between a light-emitting/light-receiving device array provided with light emitting devices and light receiving devices and a plurality of optical fibers can be easily realized, it is possible to easily realize a buffer function of optical signals or a relay function.

BRIEF DESCRIPTION OF THE DRAWINGS

FIG. 2A is a plan view of an optical lens array of the optical coupling device shown in FIG. 1, FIG. 2B is a sectional view taken on line A—A of FIG. 2A, and FIG. 2C is an enlarged sectional view of a portion B of FIG. 2B;

FIGS. 3A to 3D are sectional views illustrating steps of producing an optical lens according to the first embodiment, wherein FIG. 3A shows steps until a mask layer forming step, FIG. 3B shows steps until a mask layer patterning step, FIG. 3C shows steps until heat-treatment step, and FIG. 3D shows steps until a step of forming lens shapes on a substrate;

FIG. 16 is a perspective view showing a configuration of an optical coupling device according to a first related art;

DETAILED DESCRIPTION OF THE PREFERRED EMBODIMENTS

Hereinafter, preferred embodiments of an optical coupling device of the present invention will be described with reference to the drawings.

First Embodiment

Figure 1:
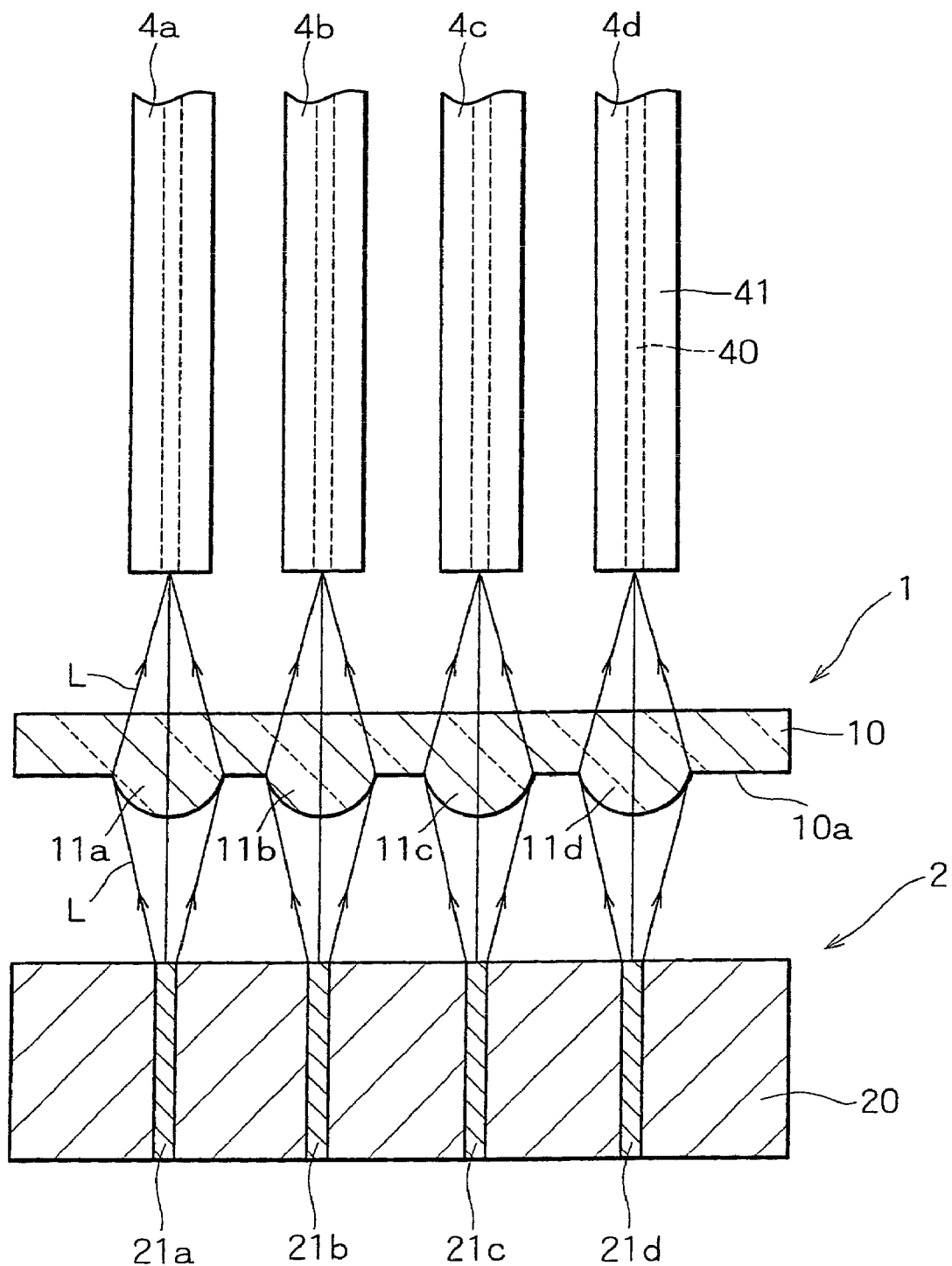
FIG. 1 is a typical view showing a schematic configuration of an optical coupling device according to a first embodiment.

FIG. 1 is a typical view showing a schematic configuration of an optical coupling device according to a first embodiment.

Referring to FIG. 1, there is shown the optical coupling device according to this embodiment, which is configured such that a light emitting device array 2, an optical lens array 1, and a plurality (four in the figure) of optical fibers 4a, 4b, 4c and 4d are disposed at specific positions. The light emitting device array 2 includes a light emitting device substrate 20, and a plurality (four in the figure) of Fabry-Perot type semiconductor lasers 21a, 21b, 21c and 21d provided on the light emitting device substrate 20. The optical lens array 1 includes a lens substrate 10 made from an optical material, and a plurality (four in the figure) of convex portions 11a, 11b, 11c and 11d functioning as optical lenses arrayed on one surface 10a of the lens substrate 10 in such a manner as to correspond to the semiconductor laser portions 21a, 21b, 21c and 21d, respectively. The optical fibers 4a, 4b, 4c and 4d, each of which includes a core portion 40 and a cladding portion 41 provided around an outer peripheral portion of the core portion 40, are arrayed in such a manner as to correspond to the semiconductor laser portions 21*a*, 21*b*, 21*c* and 21*d*, respectively.

Each of the convex portions 11*a* to 11*d* of the optical lens array 1 functions as an optical lens for coupling a light ray L, which has gone out of each of the semiconductor laser portions 21*a* to 21*d* of the light emitting device array 2, to a light incoming portion located at an end surface of the corresponding one of the optical fibers 4*a* to 4*d*.

FIG. 2A is a plan view of the optical lens array 1 of the optical coupling device according to this embodiment; FIG. 2B is a sectional view taken on line A—A of FIG. 2A; and FIG. 2C is an enlarged sectional view of a portion B of FIG. 2B.

The lens substrate 10 made from an optical material such as molten quartz or isotropic silicon oxide, and having a flat surface is prepared, and the convex portions 11*a* to 11*d* functioning as optical lenses are integrally provided on the surface 10*a* of the lens substrate 10, to form the optical lens array 1.

In the optical lens array 1, typically, each of the convex portions 11*a* to 11*d* functioning as optical lenses has a curvature of about 100 µm and a height of about 20 to 25 µm. A boundary between each of the convex portions 11*a* to 11*d* and the lens substrate 10 is formed into an approximately circular shape typically having a diameter of about 100 µm. The convex portions 11*a* to 11*d* are arrayed, typically, with a pitch of about 125 µm.

In the optical lens array 1, as shown in FIGS. 2B and 2C, grooves T are formed along the boundary having an approximately circular shape between the lens substrate 10 and each of the convex portions 11*a* to 11*d* functioning as optical lenses.

According to the optical lens array 1, since the groove T is formed around each of the convex portions 11*a* to 11*d*, a position of each of the convex portions 11*a* to 11*d* functioning optical lenses can be very easily confirmed.

Since the convex portions 11*a* to 11*d* functioning as optical lenses are provided on the flat surface of the lens substrate 10, it is possible to easily perform alignment of the convex portions 11*a* to 11*d* to the semiconductor laser portions 21*a* to 21*d* and the optical fibers 4*a* to 4*d* at the time of assembly of the optical coupling device.

A method of producing the optical lens array used for the optical coupling device according to this embodiment will be described below.

Figure 3A:
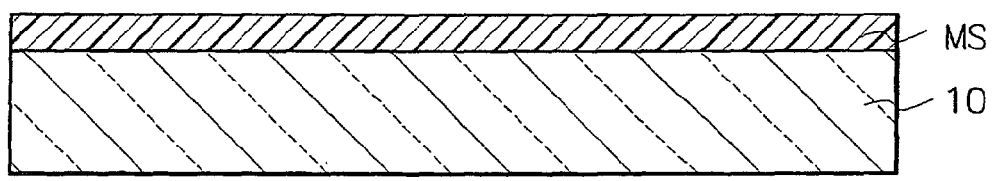

Referring to FIG. 3A, a mask layer MS composed of a photoresist layer made from a photosensitive material is formed to a specific thickness of, for example, about 20 µm on a flat surface of a lens substrate 10 made from an optical material such as molten quartz or isotropic silicon oxide by a spin-coating manner.

Figure 3B:
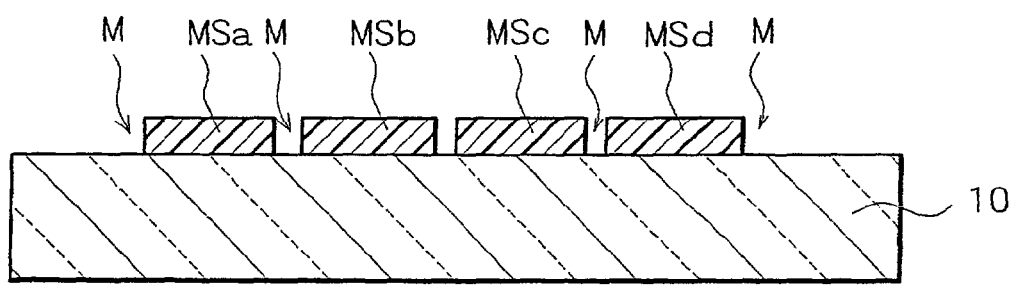

Referring to FIG. 3B, the mask layer MS is patterned into a plurality (four in the figure) of mask layer portions MSa, MSb, MSc and MSd by exposure and development performed in the photolithography step. The mask layer portions MSa to MSd, each of which is located in one lens formation region and has a circular shape of, for example, about 100 µm, are arrayed with a pitch of, for example, about 125 µm.

Figure 3C:
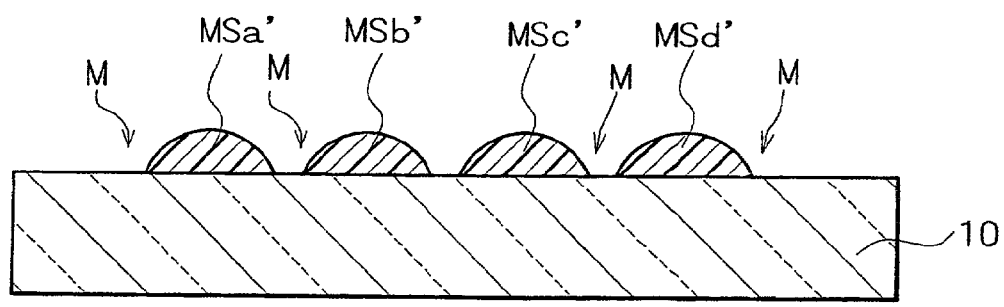

Referring to FIG. 3C, the mask layer portions MSa, MSb, MSc and MSd are heat-treated, typically, at 120° C. for 30 min. With this heat-treatment, shapes of the mask layer portions MSa, MSb, MSc and MSd are deformed so that surface areas thereof are reduced. As a result, the mask layer portions MSa, MSb, MSc and MSd become mask layer portions MSa', MSb', MSc' and MSd' having curved surfaces, respectively.

Figure 3D:
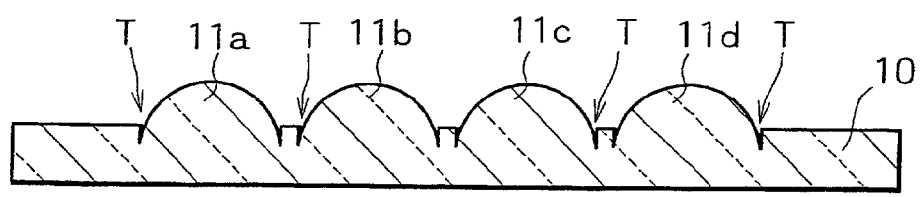

Referring to FIG. 3D, the mask layer portions MSa', MSb', MSc' and MSd' and part of the lens substrate 10 are simultaneously removed by dry etching under a condition where a selective ratio for the lens substrate 10 is substantially equal to that for each of the mask layer portions MSa', MSb', MSc' and MSd'. With this simultaneous dry etching, the shapes of the mask layer portions MSa', MSb', MSc' and MSd' are transferred to the lens substrate 10, to thereby form four convex portions 11*a*, 11*b*, 11*c* and 11*d* functioning as optical lenses, respectively. It is to be noted that as the above-described dry etching, there may be adopted reactive ion etching (RIE) using a plasma etching system including a high density plasma source, for example, an NLD (Magnetic Neutral Loop Discharge Plasma) system (reference document: H. Tsuboi, M. Itoh, M. Tanabe, T. Hayashi and T. Uchida: Jpn. J. Apply. Phys. 34(1995), 2476).

Each of the four convex portions 11*a* to 11*d* functioning as optical lenses typically has a curvature of about 100 µm and a height of about 20 to 25 µm. A boundary between each of the convex portions 11*a* to 11*d* and the lens substrate 10 is formed into an approximately circular shape having a diameter of, for example, about 100 µm. These convex portions 11*a* to 11*d* are arrayed, typically, with a pitch of about 125 µm.

According to the above-described method of producing the optical lens array, it is possible to eliminate the need of use of any mold for forming optical lenses, and hence possible to produce a large number of optical lenses at one time.

In the production step shown in FIG. 3D, the above-described NLD system, which is used as the plasma etching system including a high density plasma source, may be replaced with an "ICP" (Inductively Coupled Plasma) system (reference document: J. Hopwood, Plasma Source Sci. & Technol. 1(1992)109; and T. Fukasawa, A. Nakamura, H. Shindo and Y. Horiike: Jpn. J. Appl. Phys. 33(1994)2139).

A relationship between the above-described heat treatment temperature and a glass-transition temperature of a material of the mask layer (resist film) will be described below.

In the above production step shown in FIG. 3C, to obtain a surface, being round enough to function as an optically smooth surface, of the mask layer portion composed of the photoresist layer portion by heat treatment, it may be desirable to make the heat-treatment temperature higher than the glass-transition temperature of the material of the mask layer.

For example, the surface of the mask layer portion can be deformed into a round surface shape within one hour by setting the heat-treatment temperature higher than the glass-transition temperature of the material of the mask layer by 40° C. or more. This is an effective way to realize efficient production.

To form the mask layer portion into an optical lens shape by dry etching, the material of the mask layer is required to not be deteriorated by heat-treatment. From this viewpoint, the heat-treatment temperature must be set to a temperature at which the material of the mask later is not deteriorated, for example, a temperature lower than a carbonization temperature of the material of the mask layer. If the material of the mask layer is deteriorated by heat-treatment, then an etching rate of the material of the mask layer becomes uneven, with a result that at the time of transfer of the shapes of the mask layer portions to the substrate in order to form the convex portions, the shapes of the convex portions may be unequalized.

For example, if the heat-treatment temperature becomes 200° C. or more, then the material of the mask layer is deteriorated by so-called burning. Such deterioration of the material of the mask layer can be avoided by setting the heat-treatment temperature to a value in a range of 110 to 150° C.

If the mask layer is deteriorated during a period in which the substrate is kept in a state that the mask layer is formed thereon, it is difficult to keep the repeatability of the process. Accordingly, the glass-transition temperature of the material of the mask layer may be desirable to be higher than a reservoir temperature of the material of the mask layer, that is, room temperature.

Additionally, if the mask layer is deteriorated in the dry etching step, it is difficult to maintain the repeatability of the process. Accordingly, it may be desirable to have the glass-transition temperature of the material of the mask layer be higher than the process temperature (near room temperature).

With respect to the above-described heat-treatment, as shown in FIGS. 3B and 3C, the position of the boundary M between the lens substrate 10 and each of the mask layer portions MSa' to Msd' after the heat-treatment is not changed from the position of the boundary M between the lens substrate 10 and each of the mask layer portions MSa to MSd before the heat-treatment. Accordingly, the position of the boundary M is specified only by a photomask used for exposure of the mask layer made from a photosensitive material.

Since the photomask for exposure is formed while being precisely controlled to the size of each optical lens, the position of the optical lens can be formed at a significantly more precise position.

A height of the above-described convex portion functioning as an optical lens of the optical lens array used in this embodiment can be specified on the basis of a thickness of a mask layer (resist layer), and a curvature of the convex portion (optical lens) is specified on the basis of a diameter, thickness, and the like of the mask layer (resist film).

Accordingly, as compared with the related art optical lens array including optical lenses formed by using the diffusion method, the optical lenses in this embodiment are high in light convergence performance, that is, high in numerical aperture (NA).

In an optical lens array, an array pitch of individual optical lenses of the optical lens array is important as a design factor. From this viewpoint, according to this embodiment, an array pitch of the mask layer portions MSa to MSd shown in FIG. 3B is left as an array pitch of the mask layer portions MSa' to MSd' having curved surfaces formed by heat-treatment shown in FIG. 3C, and is further left as an array pitch of the convex portions 11a to 11d functioning as optical lenses formed by dry etching shown in FIG. 3D.

In other words, according to this embodiment, the array pitch of the individual optical lenses can be specified by a photomask for exposure, so that the positional relationship between any two of the optical lenses can be controlled with a high degree of accuracy.

In the above-described dry etching, the grooves T are formed along the boundary between the lens substrate 10 and each of the convex portions 11a to 11d.

A principle of formation of the groove T will be briefly described below.

In the heat-treatment step, the boundary between the substrate and each of the mask layer portions is not moved, and the mask layer portion is deformed so that the surface area thereof is reduced, and consequently, as shown in FIG. 3C, the mask layer portion is formed into an approximately semi-circular shape in cross-section, so that at a contact position (end of the boundary M) between the lens substrate 10 and the surface of each of the mask layer portions MSa' to MSd', not only the materials of the mask layer portion and the substrate to be etched are different from each other but also a tilt angle of the surface of each of the mask layer portions MSa' to MSd' is maximized.

Accordingly, in the dry etching step, a plasma density contributing to etching becomes discontinuous at the contact position (end of the boundary M) between the lens substrate 10 and each of the convex portions MSa' to MSd', whereby the grooves T are formed in the lens substrate 10 at both ends of the boundary M.

Since the groove T is formed around each of the optical lenses produced according to this embodiment, it is possible to very easily confirm a position of the optical lens.

According to the optical coupling device in this embodiment, light having gone out of each of the light emitting devices can be coupled to the corresponding one of the optical fibers by using the optical lens array including the convex portions functioning as the optical lenses arrayed on the lens substrate. As a result, it is possible to eliminate the need of use of the related art optical fiber mounting substrate provided with recesses for ball lenses and grooves for optical fibers, and hence to reduce the number of parts. Since the expensive optical fiber mounting substrate is not used and the number of parts can be reduced, the production cost of the optical coupling device can be reduced.

The optical lens array produced in accordance with the above-described method can be configured such that the optical lenses, each of which has a high NA, are arrayed on the lens substrate.

The high NA optical lens makes it possible to couple light having gone out of a light emitting device to the corresponding optical fiber at a high convergence comparable to that of a ball lens, and hence to enhance the utilization factor of light. Further, such high NA optical lenses are arrayed at a high degree of integration, more specifically, with a narrow pitch without occurrence of a problem associated with crosstalk.

In the optical lens array produced in accordance with the above-described method, since the exposure/development step for the mask layer (resist layer) becomes the step of determining the positions of the optical lenses formed on the lens substrate, the positioning of the array of the optical lenses can be highly accurately performed.

Accordingly, the array pitch of the optical lenses is allowed to easily agree with that of light emitting devices, and thereby a plurality of the optical lenses can be simultaneously, easily, highly accurately aligned to a plurality of light emitting devices and a plurality of optical fibers.

Although the optical coupling device has a complex structure for optically coupling a plurality of light emitting devices and a plurality of optical fibers to each other, it can be assembled without increasing the number of assembling steps.

In the related art method in which ball lenses are arrayed in holes formed in a substrate and optical fibers are arrayed in grooves formed in the substrate, it is required to provide both a working space for coating of an adhesive and a working space for clamping the ball lenses. However, according to the optical coupling device in this embodiment, since the optical lenses are arrayed on the lens substrate by the exposure/development step using the mask layer (resist layer), it is possible to eliminate the need of provision of the above working spaces and hence to realize array of the optical lenses with a narrower pitch.

As described above, according to the optical coupling device in this embodiment, it is possible to reduce the number of parts of the optical coupling device by using the optical lens array and hence to reduce the production cost of the optical coupling device.

In particular, since the optical coupling device makes use of the high NA optical lens array formed by the manner of forming a mask layer having a specific pattern on the lens substrate, deforming each of the mask layer portions while reducing the surface area thereof by heat-treatment, and simultaneously removing the mask layer portions and part of the lens substrate by etching, it is possible to enhance the utilization factor of light.

Second Embodiment

Figure 4:
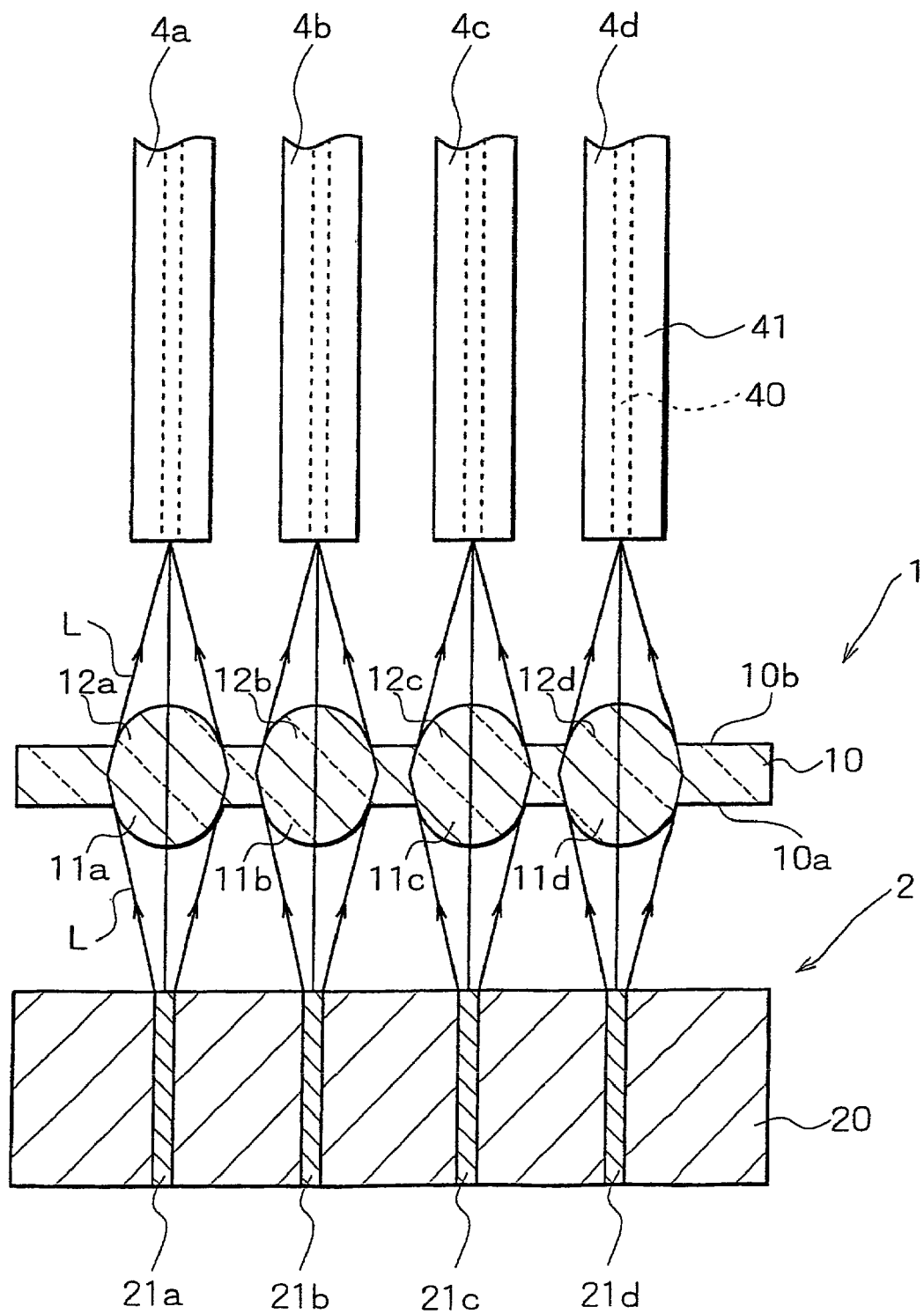
FIG. 4 is a typical view showing a schematic configuration of an optical coupling device according to a second embodiment.

FIG. 4 is a typical view showing a schematic configuration of an optical coupling device according to a second embodiment.

The optical coupling device according to this embodiment has a configuration substantially similar to that of the optical coupling device according to the first embodiment except for a shape of an optical lens array.

Referring to FIG. 4, there is shown the optical coupling device according to this embodiment, which is configured such that a light emitting device array 2, an optical lens array 1, and a plurality (four in the figure) of optical fibers 4a, 4b, 4c and 4d are disposed at specific positions. The light emitting device array 2 includes a light emitting device substrate 20 and a plurality (four in the figure) of Fabry-Perot type semiconductor lasers 21a, 21b, 21c and 21d provided on the light emitting device substrate 20. The optical lens array 1 includes a lens substrate 10 made from an optical material, and a plurality (four in the figure) of optical lenses composed of convex portions 11a, 11b, 11c and 11d formed on one surface 10a of the lens substrate 10 and convex portions 12a, 12b, 12c and 12d formed on the other surface 10b of the lens substrate 10. The optical lenses composed of the convex portions 11a and 12a, 11b and 12b, 11c and 12c, and 11d and 12d are arrayed in such a manner as to correspond to the semiconductor lasers 21a, 21b, 21c and 21d, respectively. The optical fibers 4a, 4b, 4c and 4d, each of which includes a core portion 40 and a cladding portion 41 provided around an outer peripheral portion of the core portion 40, are arrayed in such a manner as to correspond to the semiconductor lasers 21a, 21b, 21c and 21d, respectively.

A light ray L, which has gone out of each of the semiconductor laser portions 21a to 21d of the light emitting device array 2, is coupled to a light incoming portion located at an end surface of the corresponding one of the optical fibers 4a to 4d by means of the corresponding one of the optical lenses of the optical lens array 1, which optical lenses are composed of the convex portions 11a to 11d formed on the surface 10a of the lens substrate 10 and the convex portions 12a to 12d formed on the surface 10b of the lens substrate 10.

The above-described optical lens array 1 includes the convex portions 11a to 11d formed on the surface 10a of the lens substrate 10, which convex portions are the same as those in the optical lens array shown in FIGS. 2A to 2C according to the first embodiment, and the convex portions 12a to 12d formed on the other surface 10b of the lens substrate 10, which convex portions are formed in alignment with the convex portions 11a to 11d, respectively.

The optical lenses in this embodiment are formed at a high accuracy comparable to that of the optical lenses of the optical lens array used for the optical coupling device according to the first embodiment, and are superior to the optical lenses according to the first embodiment in that each optical lens in this embodiment has a higher convergence characteristic, that is, a higher NA.

In the optical lens array according to this embodiment, the optical lenses can be formed on both surfaces of the lens substrate by repeating twice the step of forming the convex portions functioning as optical lenses on one surface of the lens substrate in the method of forming the optical lens array according to the first embodiment.

The use of the above-described optical lens array in this embodiment is advantageous in that a focal distance of each optical lens can be made shorter than that of the optical lens of the optical lens array according to the first embodiment. To be more specific, a distance between the lens substrate provided with the optical lenses and the light emitting device substrate provided with the light emitting devices, and a distance between the end surface of each optical fiber and the light emitting device substrate can be shortened. This is advantageous in thinning a thickness of the optical coupling device.

As described above, according to the optical coupling device in this embodiment, it is possible to reduce the number of parts of the optical coupling device by using the optical lens array and hence to reduce the production cost of the optical coupling device.

In particular, since the optical coupling device makes use of the high NA optical lens array formed by the manner of forming a mask layer having a specific pattern on the lens substrate, deforming each of the mask layer portions while reducing the surface area thereof by heat-treatment, and simultaneously removing the mask layer portions and part of the lens substrate by etching, it is possible to enhance the utilization factor of light.

Third Embodiment

Figure 5:
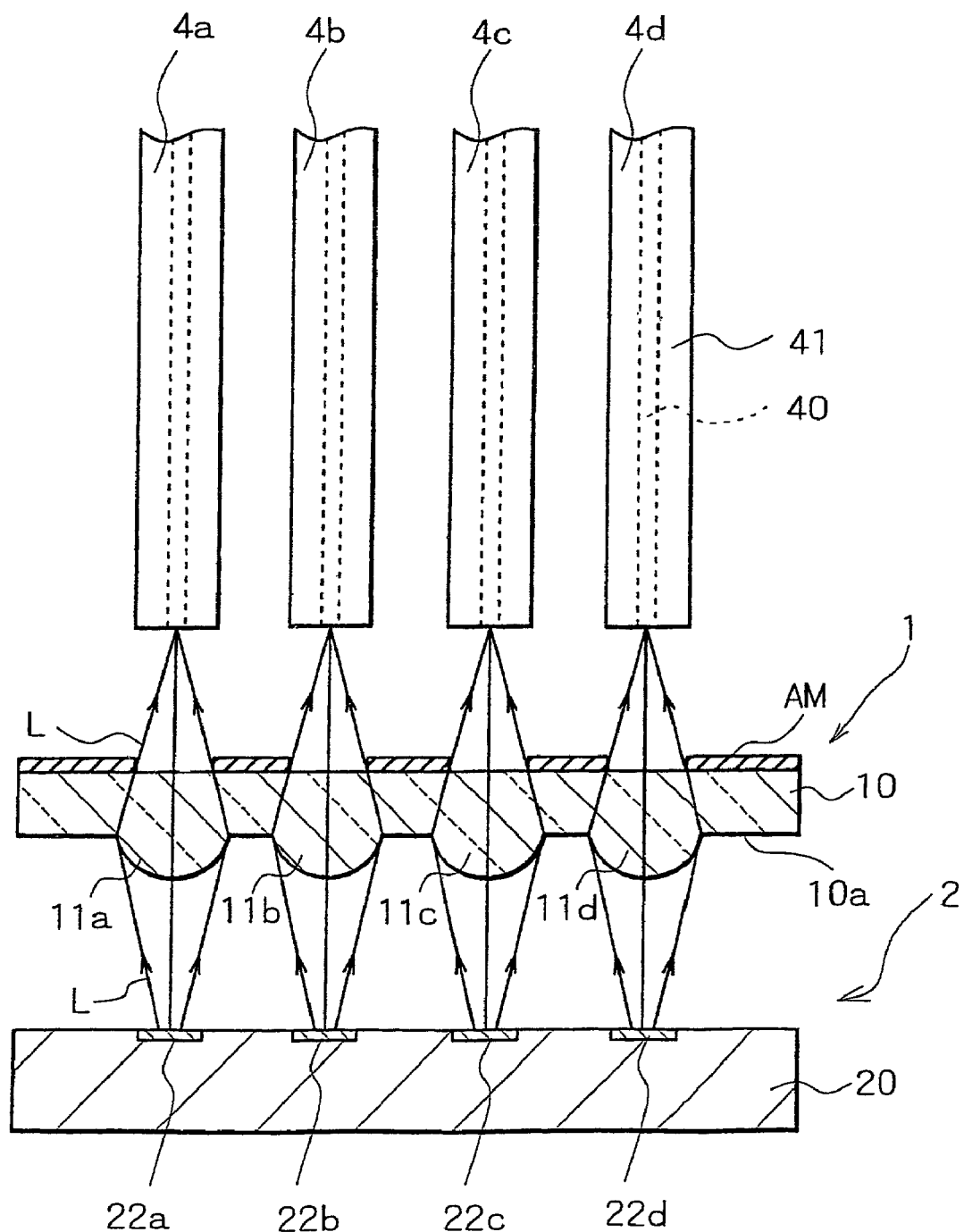
FIG. 5 is a typical view showing a schematic configuration of an optical coupling device according to a third embodiment.

FIG. 5 is a typical view showing a schematic configuration of an optical coupling device according to a third embodiment.

The optical coupling device according to this embodiment has a configuration substantially similar to that of the first embodiment except that an array of light emitting diodes (LEDs) are provided as a light emitting device array and a light absorbing mask having apertures is provided on an optical lens array.

Referring to FIG. 5, there is shown the optical coupling device according to this embodiment, which is configured such that a light emitting device array 2, an optical lens array 1, and a plurality (four in the figure) of optical fibers 4a, 4b, 4c and 4d are disposed at specific positions. The light emitting device array 2 includes a light emitting device substrate 20 and a plurality (four in the figure) of light emitting diode portions 22a, 22b, 22c and 22d provided on the light emitting device substrate 20. The optical lens array 1 includes a lens substrate 10 made from an optical material, and a plurality (four in the figure) of convex portions 11a, 11b, 11c and 11d functioning as optical lenses formed on one surface 10a of the lens substrate 10 in such a manner as to correspond to the light emitting diode portions 22a to 22d, respectively. The optical fibers 4a to 4d, each of which is composed of a core portion 40 and a cladding portion 41 provided around an outer peripheral portion of the core portion 40, are arrayed in such a manner as to correspond to the light emitting diode portions 22a to 22d, respectively.

Each of the convex portions 11a to 11d of the optical lens array 1 functions as an optical lens. A light ray L, which has gone out of each of the light emitting diode portions 22a to 22d of the light emitting device array 2, is coupled to a light incoming portion located at an end face of the corresponding one of the optical fibers 4a to 4d.

A light absorbing mask AM having apertures located at light passing portions is formed on the lens substrate 10 of the optical lens array 1. Except for the light absorbing mask AM, the optical lens array 1 has the same shape as that of the optical lens array shown in FIGS. 2A to 2C, and therefore, it is a highly precise optical lens array having a high NA, and can be formed in the same manner as that described in the first embodiment.

The optical coupling device using the light emitting diodes as the light emitting devices according to this embodiment has the same effect as that of the optical coupling device using the plane emission type semiconductor lasers as the light emitting devices according to the first embodiment. That is to say, according to the optical coupling device in this embodiment, the arrangement pitch of the optical lenses is allowed to easily agree with the arrangement pitch of the light emitting devices because not only the light emitting devices but also the optical lenses are formed by exposure and development using the photomask, so that the optical coupling device can be assembled without increasing the number of steps although the number thereof is large. In addition to the above effect, the optical coupling device according to this embodiment exhibits another effect that since each light emitting device (light emitting diode) has a characteristic in which light goes out of the device in the normal direction to a principal plane of the light emitting device substrate, the light emitting device array can be formed into a plate-like shape, with a result that an optical parallelism between the light emitting device array and the optical lens array can be nearly perfectly achieved only by disposing the light emitting device substrate provided with the light emitting devices in parallel to the lens substrate on which the optical lenses are formed by exposure and development using the photomask.

Since the light emitting diodes can be two-dimensionally arrayed within the light emitting device substrate, as compared with the optical coupling device according to the first embodiment, the optical coupling device is advantageous in easily realizing miniaturization and in increasing the number of optical fibers, that is, improving transfer data.

In an optical coupling device using an optical lens array including an array of a plurality of the related art optical lenses and using light emitting diodes as light sources, since an extension angle of light emerged from each light emitting diode is large and a convergence characteristic of each optical lens is poor, so that an utilization factor of light may be degraded and a crosstalk may be increased, with a result that it is difficult to realize multi-array of the optical lenses. However, according to the optical coupling device in this embodiment, since the light convergence characteristic of each optical lens is high, that is, the NA thereof is high, it is possible to realize an array of the optical lenses with a relatively narrow pitch while enhancing the utilization of light.

Although the optical coupling device according to the first embodiment adopts the light emitting device array including an array of a plurality of the Fabry-Perot type semiconductor lasers as the light emitting devices, the optical coupling device according to this embodiment adopts the light emitting device array including an array of the light emitting diodes as the light emitting devices. As compared with the optical coupling device according to the first embodiment, the optical coupling device according to this embodiment is advantageous in that a production cost of the light emitting device array is low and also a production yield thereof is high. As a result, the optical coupling device according to this embodiment is more suitable as an optical coupling device used for ordinary homes.

According to the optical coupling device in this embodiment, since the light absorbing mask having the apertures is formed on the lens substrate of the optical lens array, it is possible to reduce the number of parts and reduce the number of the mounting steps, and also to reduce the degree of crosstalk of signals from optical fibers located in proximity to each other by the effect of provision of the light absorbing mask having the apertures in an optical path of light traveling from each of the light emitting diodes to the corresponding one of the optical fibers.

As described above, according to the optical coupling device in this embodiment, it is possible to reduce the number of parts of the optical coupling device by using the optical lens array and hence to reduce the production cost of the optical coupling device.

In particular, since the optical coupling device makes use of the high NA optical lens array formed by the manner of forming a mask layer having a specific pattern on the lens substrate, deforming each of the mask layer portions while reducing the surface area thereof by heat-treatment, and simultaneously removing the mask layer portions and part of the lens substrate by etching, it is possible to enhance the utilization factor of light.

Fourth Embodiment

Figure 6:
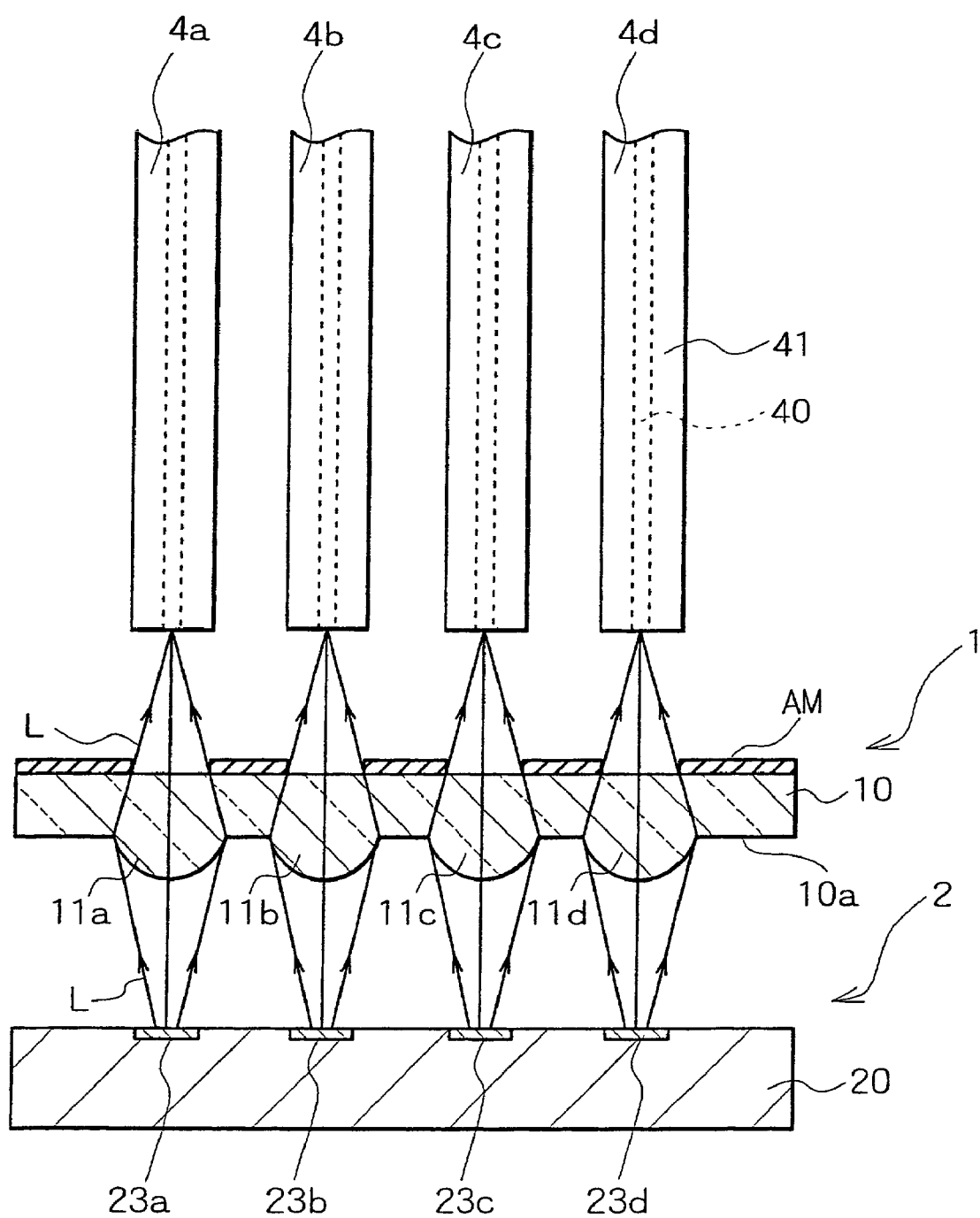
FIG. 6 is a typical view showing a schematic configuration of an optical coupling device according to a fourth embodiment.

FIG. 6 is a typical view showing a schematic configuration of an optical coupling device according to a fourth embodiment.

The optical coupling device according to this embodiment has a configuration substantially similar to that of the optical coupling device according to the third embodiment except that a light emitting device array is composed of an array of a plurality of plane emission type semiconductor lasers.

Referring to FIG. 6, there is shown the optical coupling device according to this embodiment, which is configured such that a light emitting device array 2, an optical lens array 1, and a plurality (four in the figure) of optical fibers 4a, 4b, 4c and 4d are disposed at specific positions. The light emitting device array 2 includes a light emitting device substrate 20, and a plurality (four in the figure) of plane emission type semiconductor lasers 23a, 23b, 23c, and 23d provided on the light emitting device substrate 20. The optical lens array 1 includes a lens substrate 10 made from an optical material, and a plurality (four in the figure) of convex portions 11a, 11b, 11c and 11d functioning as optical lenses arrayed on one surface 10a of the lens substrate 10 in such a manner as to correspond to the plane emission type semiconductor laser portions 23a, 23b, 23c and 23d, respectively. The optical fibers 4a, 4b, 4c and 4d, each of which includes a core portion 40 and a cladding portion 41 provided around an outer peripheral portion of the core portion 40, are arrayed in such a manner as to correspond to the plane emission type semiconductor laser portions 23a, 23b, 23c and 23d, respectively.

Each of the convex portions 11a to 11d of the optical lens array 1 functions as an optical lens for coupling a light ray L, which has gone out of each of the plane emission type semiconductor laser portions 23a to 23d of the light emitting device array 2, to a light incoming portion located at an end surface of the corresponding one of the optical fibers 4a to 4d.

Like the optical lens array according to the third embodiment, a light absorbing mask AM having apertures is formed on the lens substrate 10 of the optical lens array 1.

The optical coupling device according to this embodiment exhibits the same effect as that of the third embodiment. That is to say, it is possible to reduce the number of parts of the optical coupling device by using the optical lens array and hence to reduce a production cost of the optical coupling device.

In particular, since the optical coupling device makes use of the high NA optical lens array formed by the manner of forming a mask layer having a specific pattern on the lens substrate, deforming each of the mask layer portions while reducing the surface area thereof by heat-treatment, and simultaneously removing the mask layer portions and part of the lens substrate by etching, it is possible to enhance the utilization factor of light.

Fifth Embodiment

Figure 7:
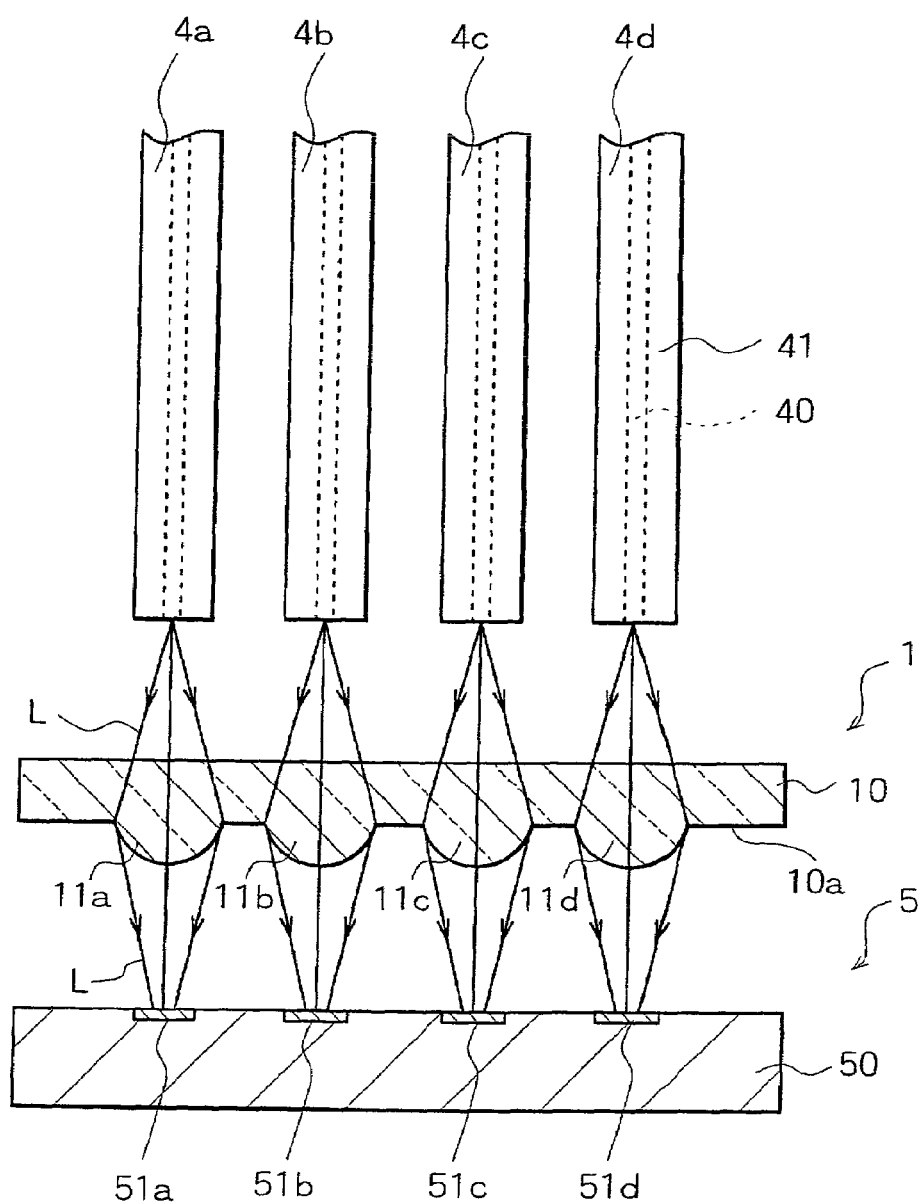
FIG. 7 is a typical view showing a schematic configuration of an optical coupling device according to a fifth embodiment.

FIG. 7 is a typical view showing a schematic configuration of an optical coupling device according to a fifth embodiment.

The optical coupling device according to this embodiment has a configuration substantially similar to that of the optical coupling device according to the first embodiment except that optical fibers are disposed on the light outgoing side and a light receiving device array including a plurality of photodiodes is disposed on a light incoming side.

Referring to FIG. 7, there is shown the optical coupling device according to this embodiment, which is configured such that a plurality (four in the figure) of optical fibers 4a, 4b, 4c and 4d, an optical lens array 1, and a light receiving device array 5 are disposed at specific positions. Each of the optical fibers 4a, 4b, 4c and 4d includes a core portion 40 and a cladding portion 41 provided around an outer peripheral portion of the core portion 40. The optical lens array 1 includes a lens substrate 10 made from an optical material, and a plurality (four in the figure) of convex portions 11a, 11b, 11c and 11d functioning as optical lenses arrayed on one surface 10a of the lens substrate 10 in such a manner as to correspond to the optical fibers 4a, 4b, 4c and 4d, respectively. The light receiving device array 5 includes a light receiving device substrate 50, and a plurality (four in the figure) of photodiode portions 51a, 51b, 51c and 51d arrayed on the light receiving device substrate 50 in such a manner as to correspond to the optical fibers 4a, 4b, 4c and 4d, respectively.

Each of the convex portions 11a to 11d of the optical lens array 1 functions as an optical lens for coupling a light ray L, which has gone out of each of the optical fibers 4a to 4d, to the corresponding light incoming portion, that is, the corresponding one of the photodiode portions 51a to 51d of the light receiving device array 5. A change in light quantity with elapsed time (signal), which has been wave-guided through each of the optical fibers 4a to 4d, is converted into an electric signal by the corresponding one of the photodiode portions 51a to 51d.

The optical lens array 1 has the same shape as that of the optical lens array shown in FIGS. 2A to 2C, and therefore, it has a high NA and a high accuracy and can be formed in the same manner as that described in the first embodiment.

According to the optical coupling device in this embodiment, light having gone out of each of the optical fibers can be coupled to the corresponding one of the light receiving devices by using the optical lens array including the convex portions functioning as the optical lenses arrayed on the lens substrate. As a result, it is possible to eliminate the need of use of the related art optical fiber mounting substrate provided with recesses for ball lenses and grooves for optical fibers, and hence to reduce the number of parts. Since the expensive optical fiber mounting substrate is not used and the number of parts can be reduced, the production cost of the optical coupling device can be reduced.

The optical lens array according to this embodiment can be configured such that the optical lenses, each of which has a high NA, are arrayed on the lens substrate.

The high NA optical lens makes it possible to couple light having gone out of an optical fiber to the corresponding light receiving device at a high convergence comparable to that of a ball lens, and hence to enhance the utilization factor of light. Further, such high NA optical lenses are arrayed at a higher degree of integration, that is, with a narrower pitch without occurrence of a problem associated with crosstalk.

In the optical lens array produced in accordance with the above-described method, since the exposure/development step for the mask layer (resist layer) becomes the step of determining the positions of the optical lenses formed on the lens substrate, the positioning of the array of the optical lenses can be performed with a high degree of accuracy.

Accordingly, the array pitch of the optical lenses is allowed to easily agree with that of light receiving devices, and thereby a plurality of the optical lenses can be simultaneously, easily, highly accurately aligned to a plurality of light receiving devices and a plurality of optical fibers.

Although the optical coupling device has a complex structure for optically coupling a plurality of light receiving devices and a plurality of optical fibers to each other, it can be assembled without increasing the number of assembling steps.

Since the light receiving device array is formed into a plate-like shape and the plurality of optical lenses are formed by exposure and development using a photomask, an optical parallelism between the light receiving device array and the optical lens array can be nearly perfectly achieved only by disposing the light receiving device substrate provided with the light receiving devices in parallel to the lens substrate provided with the optical lenses.

In the related art method in which ball lenses are arrayed in holes formed in a substrate and optical fibers are arrayed in grooves formed in the substrate, it is required to provide both a working space for coating of an adhesive and a working space for clamping the ball lenses. However, according to the optical coupling device in this embodiment, since the optical lenses are arrayed on the lens substrate by the exposure/development step using the mask layer (resist layer), it is possible to eliminate the need of provision of the above working spaces and hence to realize array of the optical lenses with a narrower pitch.

As described above, according to the optical coupling device in this embodiment, it is possible to reduce the number of parts of the optical coupling device by using the optical lens array and hence to reduce the production cost of the optical coupling device.

In particular, since the optical coupling device makes use of the high NA optical lens array formed by the manner of forming a mask layer having a specific pattern on the lens substrate, deforming each of the mask layer portions while reducing the surface area thereof by heat-treatment, and simultaneously removing the mask layer portions and part of the lens substrate by etching, it is possible to enhance the utilization factor of light.

Sixth Embodiment

Figure 8:
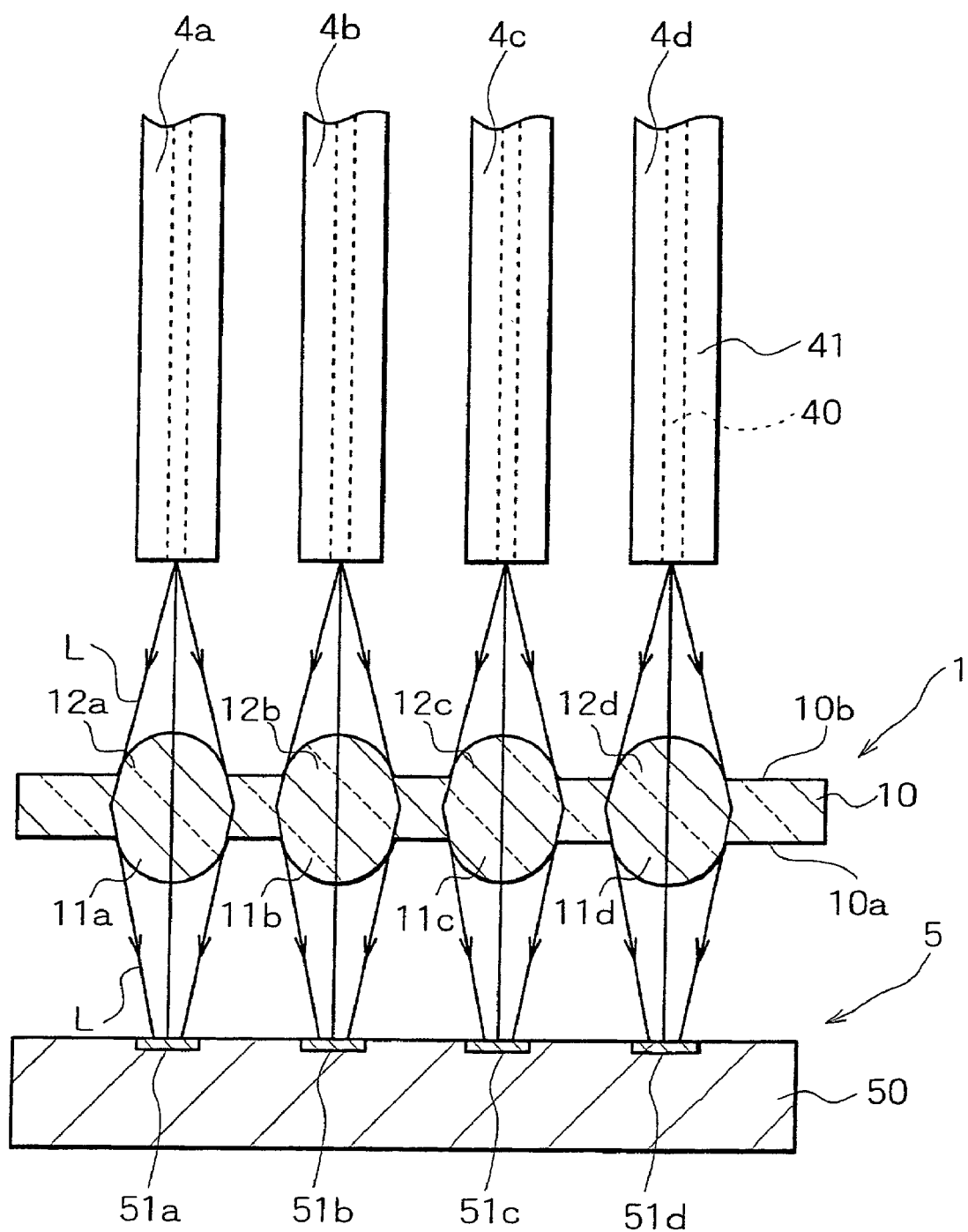
FIG. 8 is a typical view showing a schematic configuration of an optical coupling device according to a sixth embodiment.

FIG. 8 is a typical view showing a schematic configuration of an optical coupling device according to a sixth embodiment.

The optical coupling device according to this embodiment has a configuration substantially similar to that of the optical coupling device according to the fifth embodiment except for a shape of an optical lens array.

Referring to FIG. 8, there is shown the optical coupling device according to this embodiment, which is configured such that a plurality (four in the figure) of optical fibers 4a, 4b, 4c and 4d, an optical lens array 1, and a light receiving device array 5 are disposed at specific positions. Each of the optical fibers 4a, 4b, 4c and 4d includes a core portion 40 and a cladding portion 41 provided around an outer peripheral portion of the core portion 40. The optical lens array 1 includes a lens substrate 10 made from an optical material, and a plurality (four in the figure) of optical lenses composed of convex portions 11a, 11b, 11c and 11d arrayed on one surface 10a of the lens substrate 10 and convex portions 12a, 12b, 12c and 12d arrayed on the other surface 10b of the lens substrate 10. These optical lenses are arrayed in such a manner as to correspond to the optical fibers 4a, 4b, 4c and 4d, respectively. The light receiving device array 5 includes a light receiving device substrate 50, and a plurality (four in the figure) of photodiode portions 51a, 51b, 51c and 51d arrayed on the light receiving device substrate 50 in such a manner as to correspond to the optical fibers 4a, 4b, 4c and 4d, respectively.

A light ray L, which has gone out of each of the optical fibers 4a to 4d, is coupled to the corresponding light incoming portion, that is, the corresponding one of the photodiode portions 51a to 51d of the light receiving device array 5 by means of the corresponding one of the optical lenses of the optical lens array 1, which optical lenses are composed of the convex portions 11a to 11d formed on the surface 10a of the lens substrate 10 and the convex portions 12a to 12d formed on the surface 10b of the lens substrate 10.

Like the optical lens array according to the second embodiment, the above-described optical lens array 1 includes the convex portions 11a to 11d formed on the surface 10a of the lens substrate 10, which convex portions are the same as those of the optical lens array according to the fifth embodiment, and the convex portions 12a to 12d formed on the other surface 10b of the lens substrate 10, which convex portions are formed in alignment with the convex portions 11a to 11d, respectively. The optical lenses in this embodiment are formed at a high accuracy comparable to that of the optical lenses according to the fifth embodiment, and are superior to the optical lenses according to the fifth embodiment in that each optical lens in this embodiment has a higher convergence characteristic thereof, that is, a higher NA.

In the optical lens array according to this embodiment, like the optical lens array according to the second embodiment, the optical lenses can be formed on both surfaces of the lens substrate by repeating twice the step of forming the convex portions functioning as optical lenses on one surface of the lens substrate.

The use of the above-described optical lens array in this embodiment is advantageous in that a focal distance of each optical lens can be made shorter than that of the optical lens of the optical lens array according to the fifth embodiment. To be more specific, a distance between the lens substrate provided with the optical lenses and the light receiving device substrate provided with the light receiving devices, and a distance between the end surface of each optical fiber and the light receiving device substrate can be shortened. This is advantageous in thinning a thickness of the optical coupling device.

As described above, according to the optical coupling device in this embodiment, it is possible to reduce the number of parts of the optical coupling device by using the optical lens array and hence to reduce the production cost of the optical coupling device.

In particular, since the optical coupling device makes use of the high NA optical lens array formed by the manner of forming a mask layer having a specific pattern on the lens substrate, deforming each of the mask layer portions while reducing the surface area thereof by heat-treatment, and simultaneously removing the mask layer portions and part of the lens substrate by etching, it is possible to enhance the utilization factor of light.

Seventh Embodiment

Figure 9:
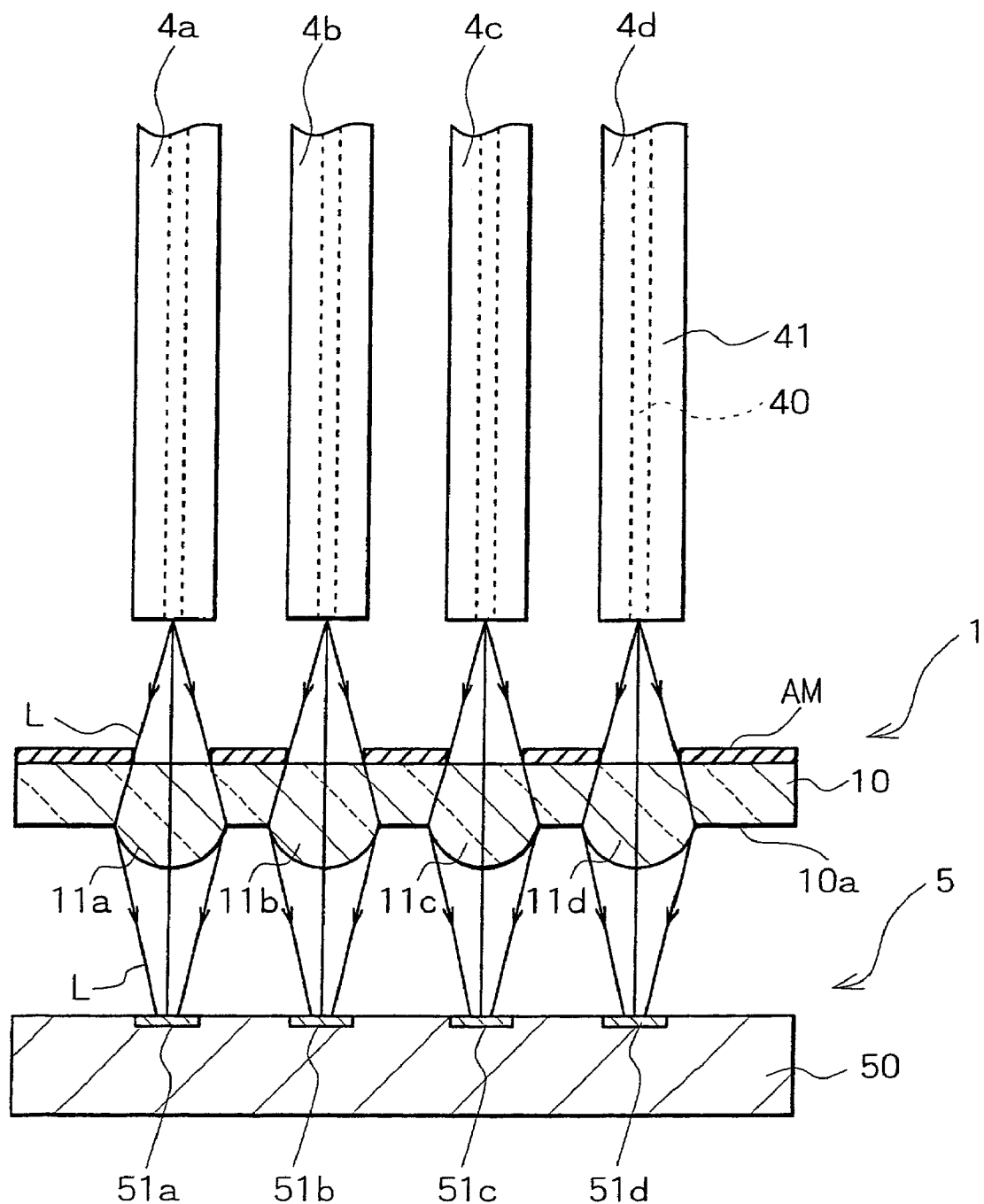
FIG. 9 is a typical view showing a schematic configuration of an optical coupling device according to a seventh embodiment.

FIG. 9 is a typical view showing a schematic configuration of an optical coupling device according to a seventh embodiment.

The optical coupling device according to this embodiment has a configuration substantially similar to that of the optical coupling device according to the fifth embodiment except that a light absorbing mask having apertures is provided on an optical lens array.

Referring to FIG. 9, there is shown the optical coupling device according to this embodiment, which is configured such that a plurality (four in the figure) of optical fibers 4a, 4b, 4c and 4d, an optical lens array 1, and a light receiving device array 5 are disposed at specific positions. Each of the optical fibers 4a, 4b, 4c and 4d includes a core portion 40 and a cladding portion 41 provided around an outer peripheral portion of the core portion 40. The optical lens array 1 includes a lens substrate 10 made from an optical material, and a plurality (four in the figure) of convex portions 11a, 11b, 11c and 11d functioning as optical lenses arrayed on one surface 10a of the lens substrate 10 in such a manner as to correspond to the optical fibers 4a, 4b, 4c and 4d, respectively. The light receiving device array 5 includes a light receiving device substrate 50, and a plurality (four in the figure) of photodiode portions 51a, 51b, 51c and 51d arrayed on the light receiving device substrate 50 in such a manner as to correspond to the optical fibers 4a, 4b, 4c and 4d, respectively.

Each of the convex portions 11a to 11d of the optical lens array 1 functions as an optical lens for coupling a light ray L, which has gone out of each of the optical fibers 4a to 4d, to the corresponding light incoming portion, that is, the corresponding one of the photodiode portions 51a to 51d of the light receiving device array 5. A change in light quantity with elapsed time (signal), which has been wave-guided through each of the optical fibers 4a to 4d, is converted into an electric signal by the corresponding one of the photodiode portions 51a to 51d.

A light absorbing mask AM having apertures at light passing portions is formed on the lens substrate 10 of the optical lens array 1.

According to the optical coupling device in this embodiment, since the light absorbing mask having the apertures is formed on the lens substrate of the optical lens array, it is possible to reduce the number of parts and reduce the number of the mounting steps, and also to reduce the degree of crosstalk of signals from optical fibers located in proximity to each other by the effect of provision of the light absorbing mask having the apertures in an optical path of light traveling from each of the optical fibers to the corresponding one of the light receiving devices.

According to the optical coupling device in this embodiment, it is possible to reduce the number of parts of the optical coupling device by using the optical lens array and hence to reduce the production cost of the optical coupling device.

In particular, since the optical coupling device makes use of the high NA optical lens array formed by the manner of forming a mask layer having a specific pattern on the lens substrate, deforming each of the mask layer portions while reducing the surface area thereof by heat-treatment, and simultaneously removing the mask layer portions and part of the lens substrate by etching, it is possible to enhance the utilization factor of light.

Eighth Embodiment

Figure 10:
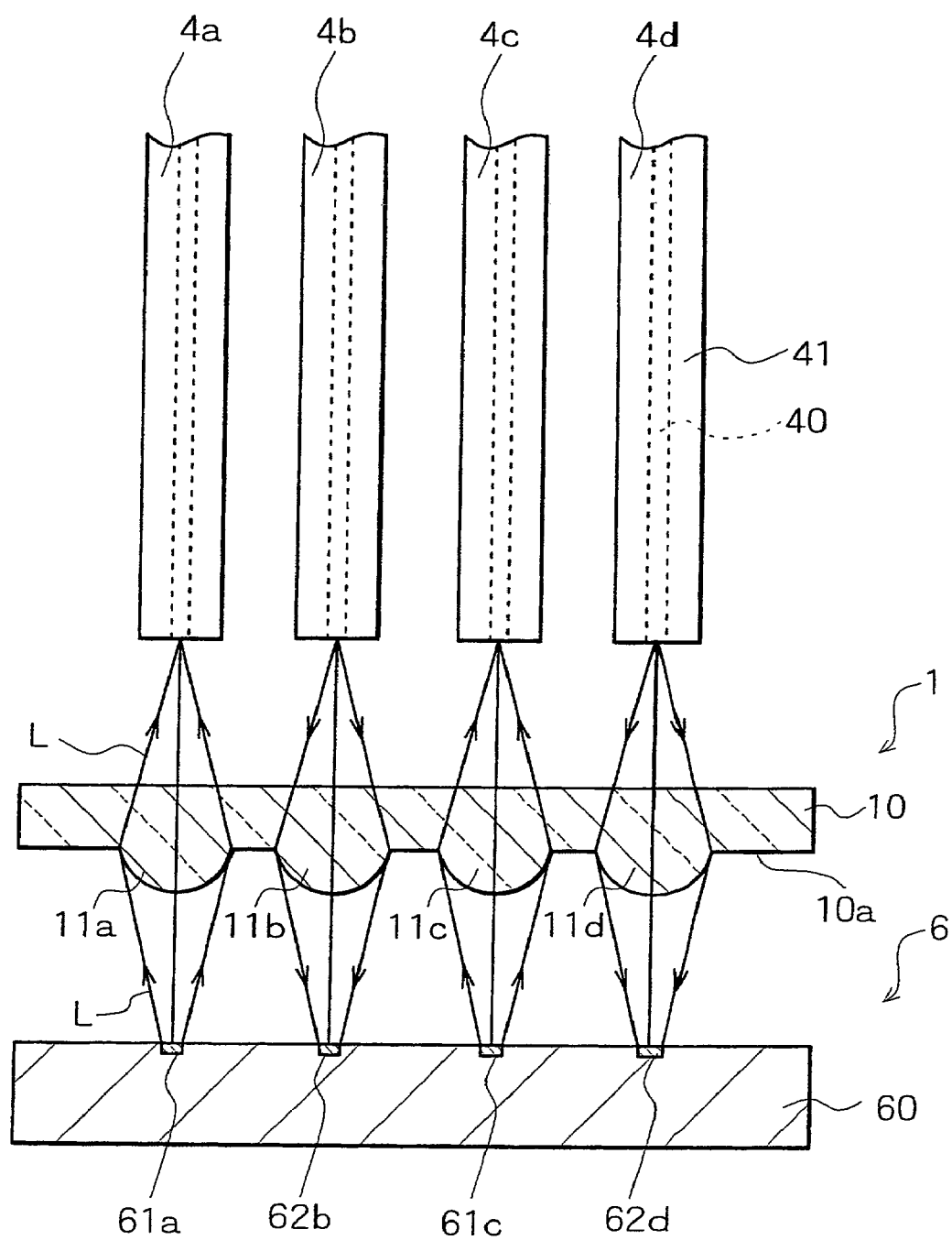
FIG. 10 is a typical view showing a schematic configuration of an optical coupling device according to an eighth embodiment.

FIG. 10 is a typical view showing a schematic configuration of an optical coupling device according to an eighth embodiment.

The optical coupling device according to this embodiment has a configuration substantially similar to that of the optical coupling device according to the first embodiment except that part of optical fibers are disposed on a light outgoing side and the rest of the optical fibers are disposed on a light incoming side, and light receiving devices corresponding to the optical fibers disposed on the light outgoing side and light emitting devices corresponding to the optical fibers disposed on the light incoming side are arrayed on the same device substrate.

Referring to FIG. 10, there is shown the optical coupling device according to this embodiment, which is configured such that a plurality (four in the figure) of optical fibers 4a, 4b, 4c and 4d, an optical lens array 1, and a light-emitting/light-receiving device array 6 are disposed at specific positions. Each of the optical fibers 4a, 4b, 4c and 4d includes a core portion 40 and a cladding portion 41 provided around an outer peripheral portion of the core portion 40. The optical lens array 1 includes a lens substrate 10 made from an optical material, and a plurality (four in the figure) of convex portions 11a, 11b, 11c and 11d functioning as optical lenses arrayed on one surface 10a of the lens substrate 10 in such a manner as to correspond to the optical fibers 4a, 4b, 4c and 4d, respectively. The light-emitting/light-receiving device array 6 includes a device substrate 60, and a plurality (two in the figure) of light emitting diode portions 61a and 61c and a plurality (two in the figure) of photodiode portions 62b and 62d, which are arrayed on the same device substrate 60 in such a manner as to correspond to the optical fibers 4a, 4b, 4c and 4d, respectively.

Each of the convex portions 11a to 11d of the optical lens array 1 functions as an optical lens. A light ray L, which has gone out of each of the light emitting diodes 61a and 61c of the light-emitting/light-receiving device array 6, is coupled to a light incoming portion located to an end face of the corresponding one of the optical fibers 4a and 4c by means of the corresponding optical lens. A light ray L, which has gone out of each of the optical fibers 4b and 4d, is coupled to the corresponding light incoming portion, that is, the corresponding one of the photodiode portions 62b and 62d of the light-emitting/light-receiving device array 6 by means of the corresponding optical lens. In the latter case, a change in light quantity with elapsed time (signal), which has been wave-guided through each of the optical fibers 4b and 4d, is converted into an electric signal by the corresponding one of the photodiode portions 62b and 62d.

The optical lens array 1 has the same shape as that of the optical lens array shown in FIGS. 2A to 2C, and therefore, it has a high NA and a high accuracy and can be formed in the same manner as that described in the first embodiment.

According to the optical coupling device in this embodiment, light having gone out of each of the light emitting diodes can be coupled to the corresponding one of the optical fibers and light having gone out of each of the optical fibers can be coupled to the corresponding one of the photodiodes by using the optical lens array including the convex portions functioning as the optical lenses arrayed on the lens substrate. As a result, it is possible to eliminate the need of use of the related art optical fiber mounting substrate provided with recesses for ball lenses and grooves for optical fibers, and hence to reduce the number of parts. Since the expensive optical fiber mounting substrate is not used and the number of parts can be reduced, the production cost of the optical coupling device can be reduced.

The optical lens array according to this embodiment can be configured such that the optical lenses, each of which has a high NA, are arrayed on the lens substrate.

The high NA optical lens makes it possible to couple light having gone out of a light emitting device to the corresponding optical fiber or couple light having gone out of an optical fiber to the corresponding light receiving device at a high convergence comparable to that of a ball lens, and hence to enhance the utilization factor of light. Further, such high NA optical lenses are arrayed at a higher degree of integration, that is, with a narrower pitch without occurrence of a problem associated with crosstalk.

In the optical lens array produced in accordance with the above-described method, since the exposure/development step for the mask layer (resist layer) becomes the step of determining the positions of the optical lenses formed on the lens substrate, the positioning of the array of the optical lenses can be highly accurately performed.

Accordingly, the array pitch of the optical lenses is allowed to easily agree with that of light emitting devices and light receiving devices, and thereby a plurality of the optical lenses can be simultaneously, easily, highly accurately aligned to a plurality of light emitting devices and light receiving devices and to a plurality of optical fibers.

Although the optical coupling device has a complex structure for coupling a plurality of light emitting devices and light receiving devices and a plurality of optical fibers to each other, it can be assembled without increasing the number of assembling steps.

According to the optical coupling device in this embodiment, the light emitting diodes are used as the light emitting devices and the photodiodes are used as the light receiving devices. The light emitting device (light emitting diodes) has a characteristic in which light is emerged therefrom in the normal direction to a principal plane of the substrate, and the light receiving device (photodiode) can be easily formed as light receiving devices exhibiting an excellent sensitivity to light traveling in the normal direction to the principal direction of the substrate. Further, since not only the light emitting devices and light receiving devices but also the optical lenses are formed by exposure and development using the photomask, the array pitch of the optical lenses can be easily controlled so as to agree with the array pitch of the light emitting devices and the light receiving devices. As a result, it is possible to assemble the optical coupling device without increasing the number of assembling steps although the number of the devices is large. In addition to the above effect, according to the optical coupling device in this embodiment, since the light-emitting/light-receiving device array is formed into a plate-like shape and the plurality of optical lenses are formed by exposure and development using a photomask, an optical parallelism between the light-emitting/light-receiving device array and the optical lens array can be nearly perfectly achieved only by disposing the device substrate provided with the light emitting devices and the light receiving devices in parallel to the lens substrate provided with the optical lenses.

In the related art method in which ball lenses are arrayed in holes formed in a substrate and optical fibers are arrayed in grooves formed in the substrate, it is required to provide both a working space for coating of an adhesive and a working space for clamping the ball lenses. However, according to the optical coupling device in this embodiment, since the optical lenses are arrayed on the lens substrate by the exposure/development step using the mask layer (resist layer), it is possible to eliminate the need of provision of the above working spaces and hence to realize array of the optical lenses with a narrower pitch.

As described above, according to the optical coupling device in this embodiment, it is possible to reduce the number of parts of the optical coupling device by using the optical lens array and hence to reduce the production cost of the optical coupling device.

In particular, since the optical coupling device makes use of the high NA optical lens array formed by the manner of forming a mask layer having a specific pattern on the lens substrate, deforming each of the mask layer portions while reducing the surface area thereof by heat-treatment, and simultaneously removing the mask layer portions and part of the lens substrate by etching, it is possible to enhance the utilization factor of light.

Ninth Embodiment

Figure 11:
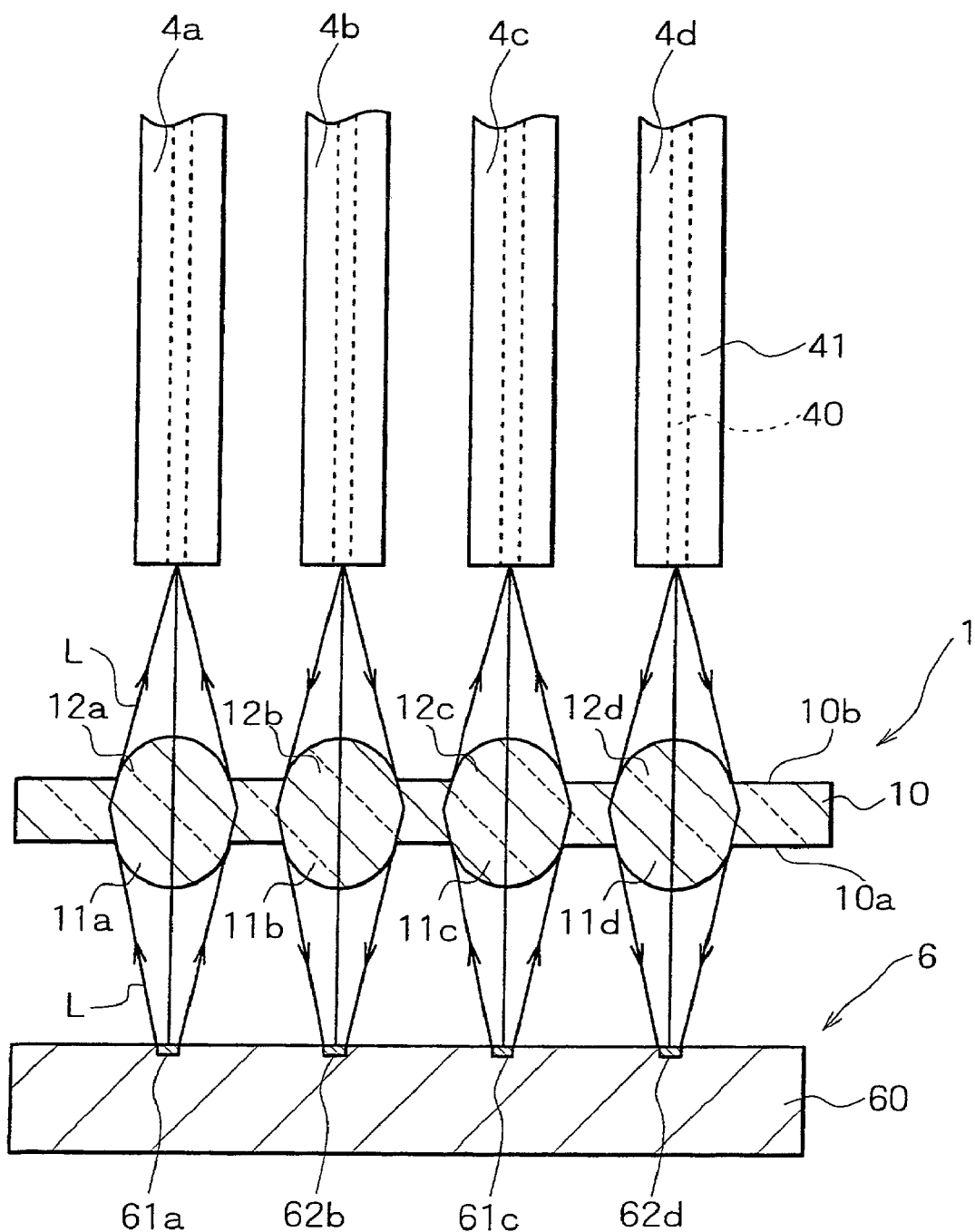
FIG. 11 is a typical view showing a schematic configuration of an optical coupling device according to a ninth embodiment.

FIG. 11 is a typical view showing a schematic configuration of an optical coupling device according to a ninth embodiment.

The optical coupling device according to this embodiment has a configuration substantially similar to that of the optical coupling device according to the eighth embodiment except for a shape of an optical lens array.

Referring to FIG. 11, there is shown the optical coupling device according to this embodiment, which is configured such that a plurality (four in the figure) of optical fibers 4*a*, 4*b*, 4*c* and 4*d*, an optical lens array 1, and a light-emitting/light-receiving device array 6 are disposed at specific positions. Each of the optical fibers 4*a*, 4*b*, 4*c* and 4*d* includes a core portion 40 and a cladding portion 41 provided around an outer peripheral portion of the core portion 40. The optical lens array 1 includes a lens substrate 10 made from an optical material, and a plurality (four in the figure) of optical lenses composed of convex portions 11*a*, 11*b*, 11*c* and 11*d* arrayed on one surface 10*a* of the lens substrate 10 and convex portions 12*a*, 12*b*, 12*c* and 12*d* arrayed on the other surface 10*b* of the lens substrate 10. These optical lenses are arrayed in such a manner as to correspond to the optical fibers 4*a*, 4*b*, 4*c* and 4*d*, respectively. The light-emitting/light-receiving device array 6 includes a device substrate 60, and a plurality (two in the figure) of light emitting diode portions 61*a* and 61*c* and a plurality (two in the figure) of photodiode portions 62*b* and 62*d*, which are arrayed on the same device substrate 60 in such a manner as to correspond to the optical fibers 4*a*, 4*b*, 4*c* and 4*d*, respectively.

Each of the combinations of the convex portions 11*a* and 12*a*, 11*b* and 12*b*, 11*c* and 12*c*, and 11*d* and 12*d* of the optical lens array 1 functions as an optical lens. A light ray L, which has gone out of each of the light emitting diodes 61*a* and 61*c* of the light-emitting/light-receiving device array 6, is coupled to a light incoming portion located to an end face of the corresponding one of the optical fibers 4*a* and 4*c* by means of the corresponding optical lens. A light ray L, which has gone out of each of the optical fibers 4*b* and 4*d*, is coupled to the corresponding light incoming portion, that is, the corresponding one of the photodiode portions 62*b* and 62*d* of the light-emitting/light-receiving device array 6 by means of the corresponding optical lens. In the latter case, a change in light quantity with elapsed time (signal), which has been wave-guided through each of the optical fibers 4*b* and 4*d*, is converted into an electric signal by the corresponding one of the photodiode portions 62*b* and 62*d*.

Like the optical lens array according to the second embodiment, the above-described optical lens array 1 includes the convex portions 11*a* to 11*d* formed on the surface 10*a* of the lens substrate 10, which convex portions are the same as those of the optical lens array according to the eighth embodiment, and the convex portions 12*a* to 12*d* formed on the other surface 10*b* of the lens substrate 10, which convex portions are formed in alignment with the convex portions 11*a* to 11*d*, respectively. The optical lenses in this embodiment are formed at a high accuracy comparable to that of the optical lenses according to the eighth embodiment, and are superior to the optical lenses according to the eighth embodiment in that each optical lens in this embodiment has a higher convergence characteristic thereof, that is, a higher NA.

In the optical lens array according to this embodiment, like the optical lens array according to the second embodiment, the optical lenses can be formed on both surfaces of the lens substrate by repeating twice the step of forming the convex portions functioning as optical lenses on one surface of the lens substrate.

The use of the above-described optical lens array in this embodiment is advantageous in that a focal distance of each optical lens can be made shorter than that of the optical lens of the optical lens array according to the eighth embodiment. To be more specific, a distance between the lens substrate provided with the optical lenses and the device substrate provided with the light emitting devices and the light receiving devices, and a distance between the end surface of each optical fiber and the device substrate can be shortened. This is advantageous in thinning a thickness of the optical coupling device.

As described above, according to the optical coupling device in this embodiment, it is possible to reduce the number of parts of the optical coupling device by using the optical lens array and hence to reduce the production cost of the optical coupling device.

In particular, since the optical coupling device makes use of the high NA optical lens array formed by the manner of forming a mask layer having a specific pattern on the lens substrate, deforming each of the mask layer portions while reducing the surface area thereof by heat-treatment, and simultaneously removing the mask layer portions and part of the lens substrate by etching, it is possible to enhance the utilization factor of light.

Tenth Embodiment

Figure 12:
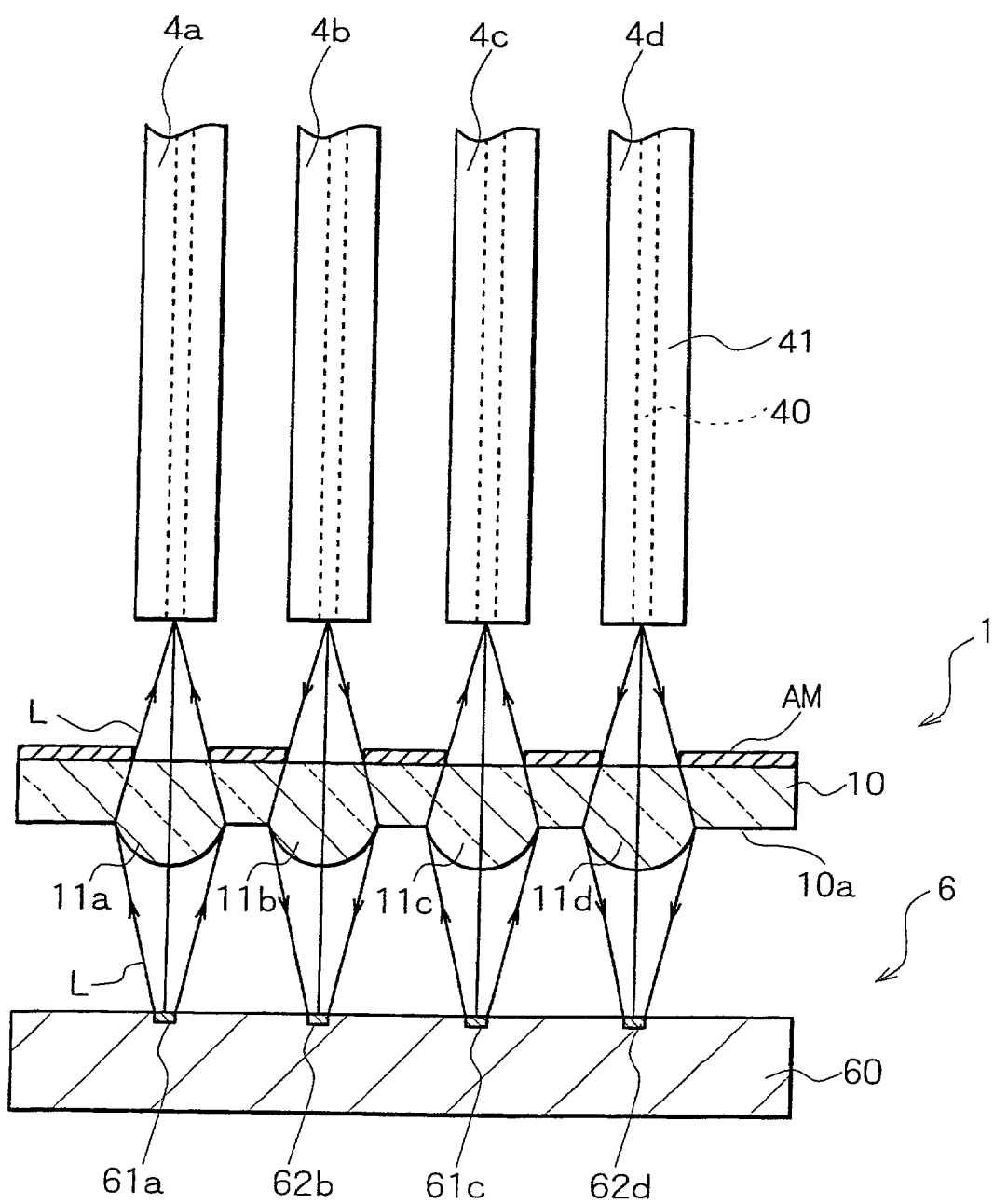
FIG. 12 is a typical view showing a schematic configuration of an optical coupling device according to a tenth embodiment.

FIG. 12 is a typical view showing a schematic view of an optical coupling device according to a tenth embodiment.

The optical coupling device according to this embodiment has a configuration substantially similar to that of the optical coupling device according to the eighth embodiment except that a light absorbing mask having apertures is provided on an optical lens array.

Referring to FIG. 12, there is shown the optical coupling device according to this embodiment, which is configured such that a plurality (four in the figure) of optical fibers 4a, 4b, 4c and 4d, an optical lens array 1, and a light-emitting/light-receiving device array 6 are disposed at specific positions. Each of the optical fibers 4a, 4b, 4c and 4d includes a core portion 40 and a cladding portion 41 provided around an outer peripheral portion of the core portion 40. The optical lens array 1 includes a lens substrate 10 made from an optical material, and a plurality (four in the figure) of convex portions 11a, 11b, 11c and 11d functioning as optical lenses arrayed on one surface 10a of the lens substrate 10 in such a manner as to correspond to the optical fibers 4a, 4b, 4c and 4d, respectively. The light-emitting/light-receiving device array 6 includes a device substrate 60, and a plurality (two in the figure) of light emitting diode portions 61a and 61c and a plurality (two in the figure) of photodiode portions 62b and 62d, which are arrayed on the same device substrate 60 in such a manner as to correspond to the optical fibers 4a, 4b, 4c and 4d, respectively.

Each of the convex portions 11a to 11d of the optical lens array 1 functions as an optical lens. A light ray L, which has gone out of each of the light emitting diodes 61a and 61c of the light-emitting/light-receiving device array 6, is coupled to a light incoming portion located to an end face of the corresponding one of the optical fibers 4a and 4c by means of the corresponding optical lens. A light ray L, which has gone out of each of the optical fibers 4b and 4d, is coupled to the corresponding light incoming portion, that is, the corresponding one of the photodiode portions 62b and 62d of the light-emitting/light-receiving device array 6 by means of the corresponding optical lens. In the latter case, a change in light quantity with elapsed time (signal), which has been wave-guided through each of the optical fibers 4b and 4d, is converted into an electric signal by the corresponding one of the photodiode portions 62b and 62d.

A light absorbing mask AM having apertures is formed on the lens substrate 10 of the optical lens array 1.

According to the optical coupling device in this embodiment, since the light absorbing mask having the apertures is formed on the lens substrate of the optical lens array, it is possible to reduce the number of parts and reduce the number of the mounting steps, and also to reduce the degree of crosstalk of signals from optical fibers located in proximity to each other by the effect of provision of the light absorbing mask having the apertures in an optical path of light traveling from each of the optical fibers to the corresponding one of the light receiving devices.

As described above, according to the optical coupling device in this embodiment, it is possible to reduce the number of parts of the optical coupling device by using the optical lens array and hence to reduce the production cost of the optical coupling device.

In particular, since the optical coupling device makes use of the high NA optical lens array formed by the manner of forming a mask layer having a specific pattern on the lens substrate, deforming each of the mask layer portions while reducing the surface area thereof by heat-treatment, and simultaneously removing the mask layer portions and part of the lens substrate by etching, it is possible to enhance the utilization factor of light.

Eleventh Embodiment

Figure 13:
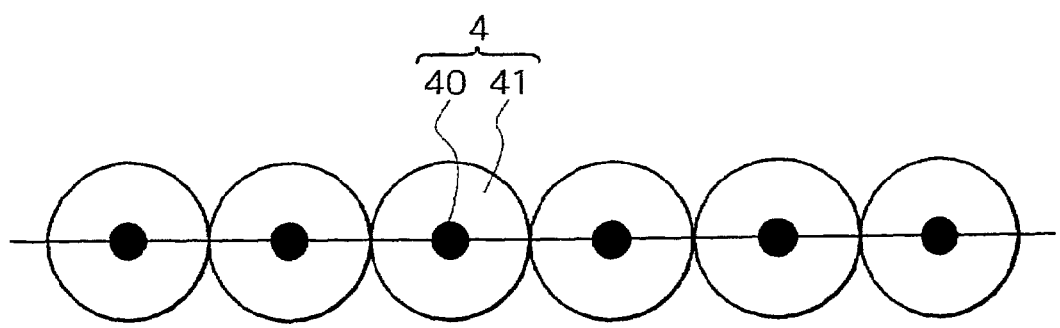
FIG. 13 is a typical view illustrating an array of optical fibers according to an eleventh embodiment.
Figure 14:
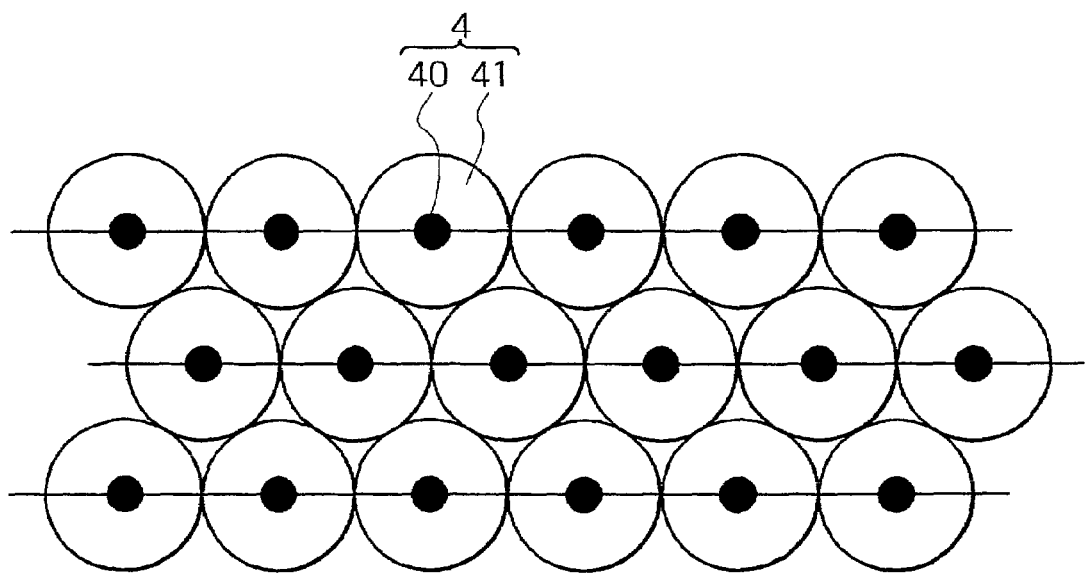
FIG. 14 is a typical view illustrating another array of optical fibers according to the eleventh embodiment.
Figure 15:
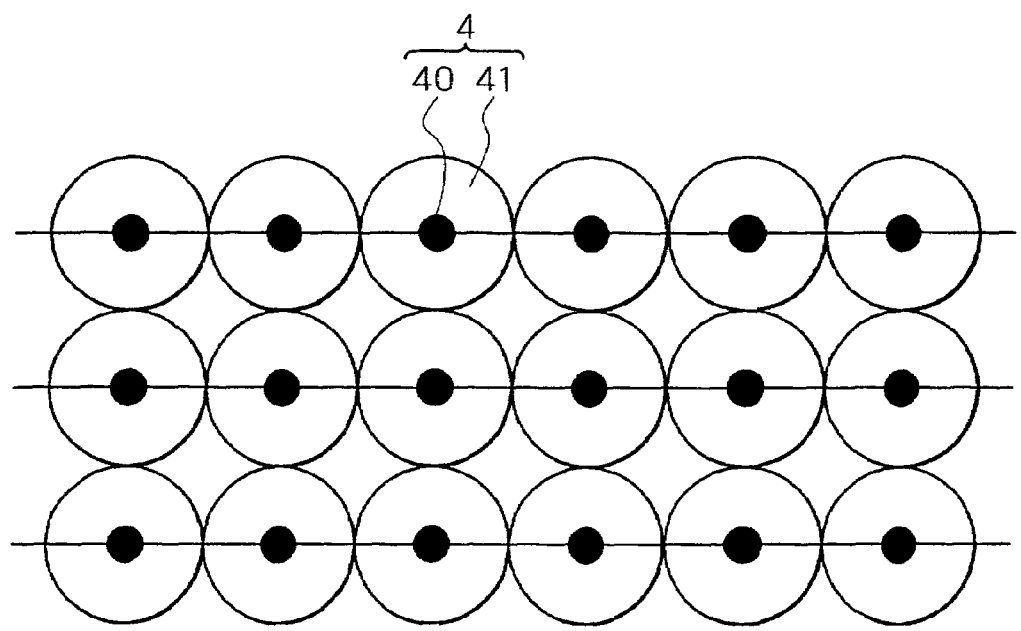
FIG. 15 is a typical view illustrating further another array of optical fibers according to the eleventh embodiment.
Figure 17:
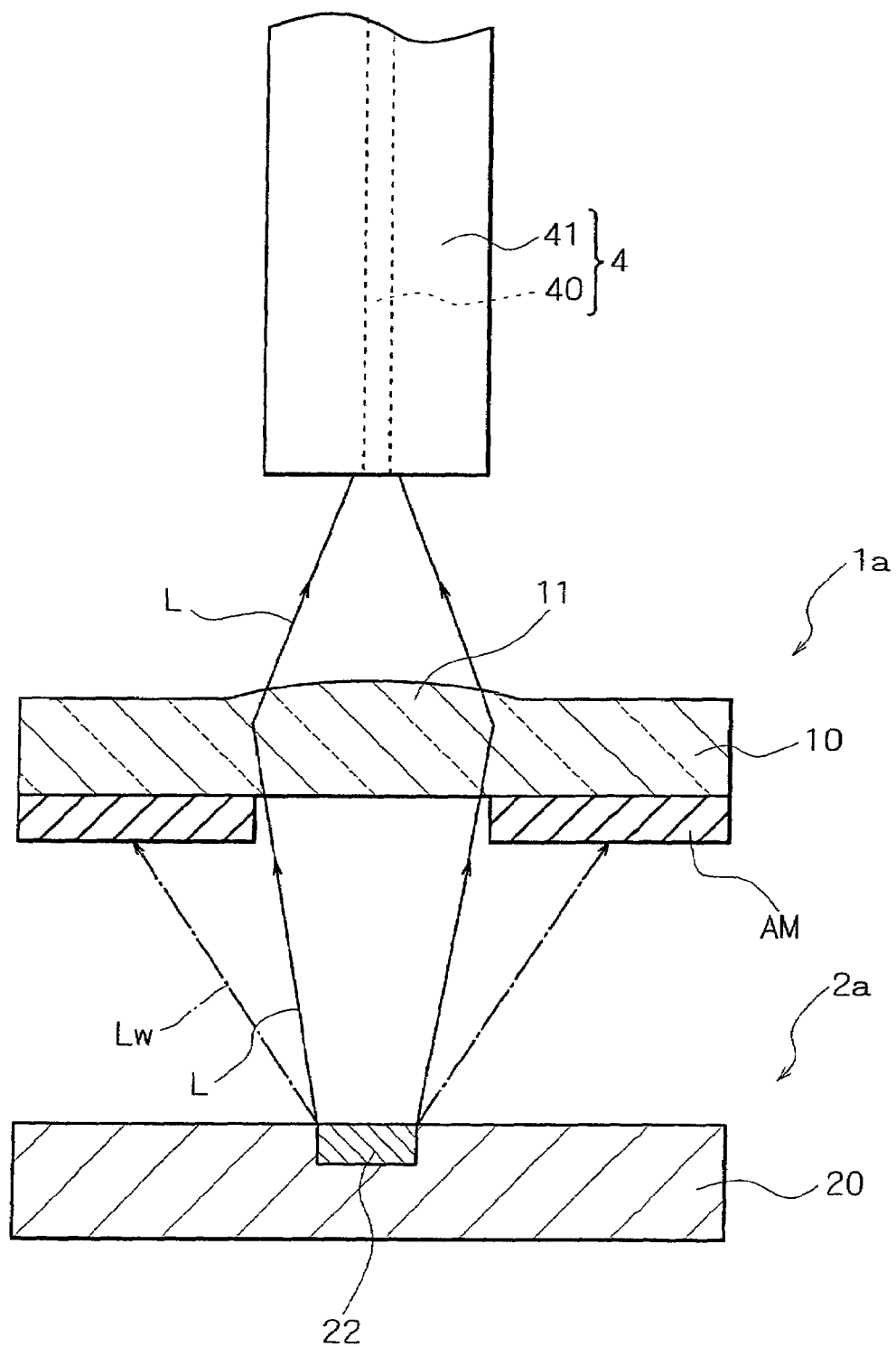
FIG. 17 is a typical view showing a schematic configuration of an optical coupling device according to a second related art.
Figure 18:
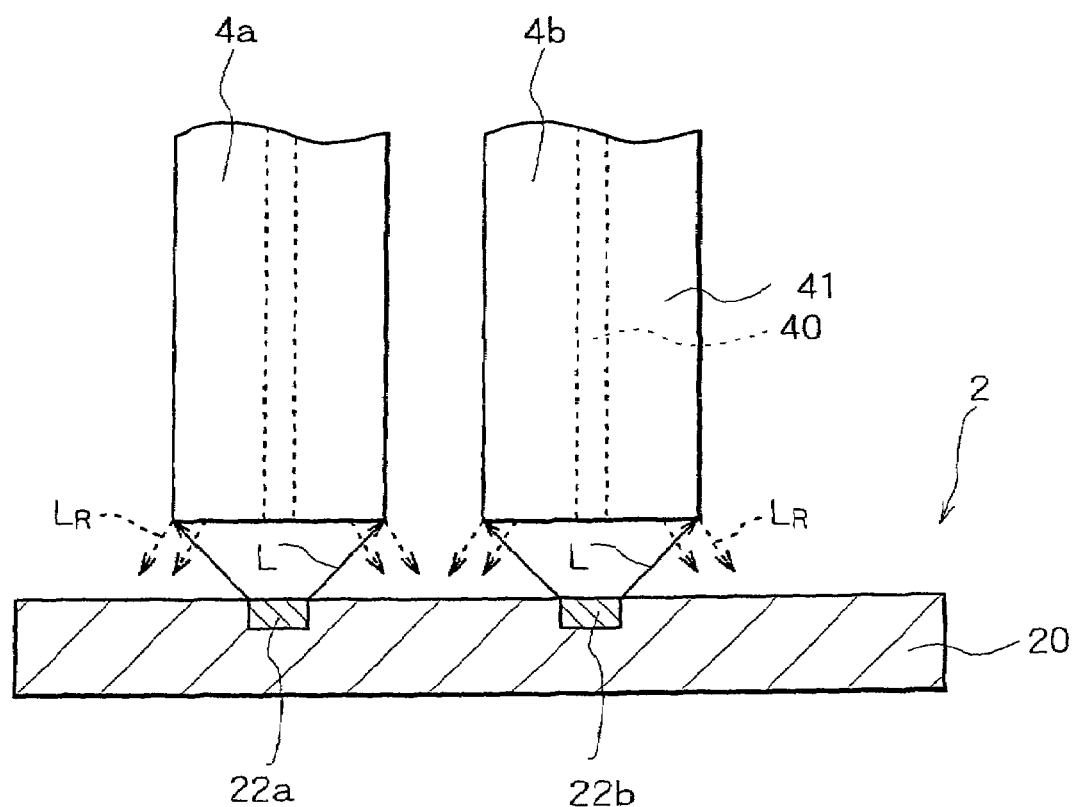
FIG. 18 is a typical view showing a schematic configuration of an optical coupling device according to a third related art.
Figure 19:
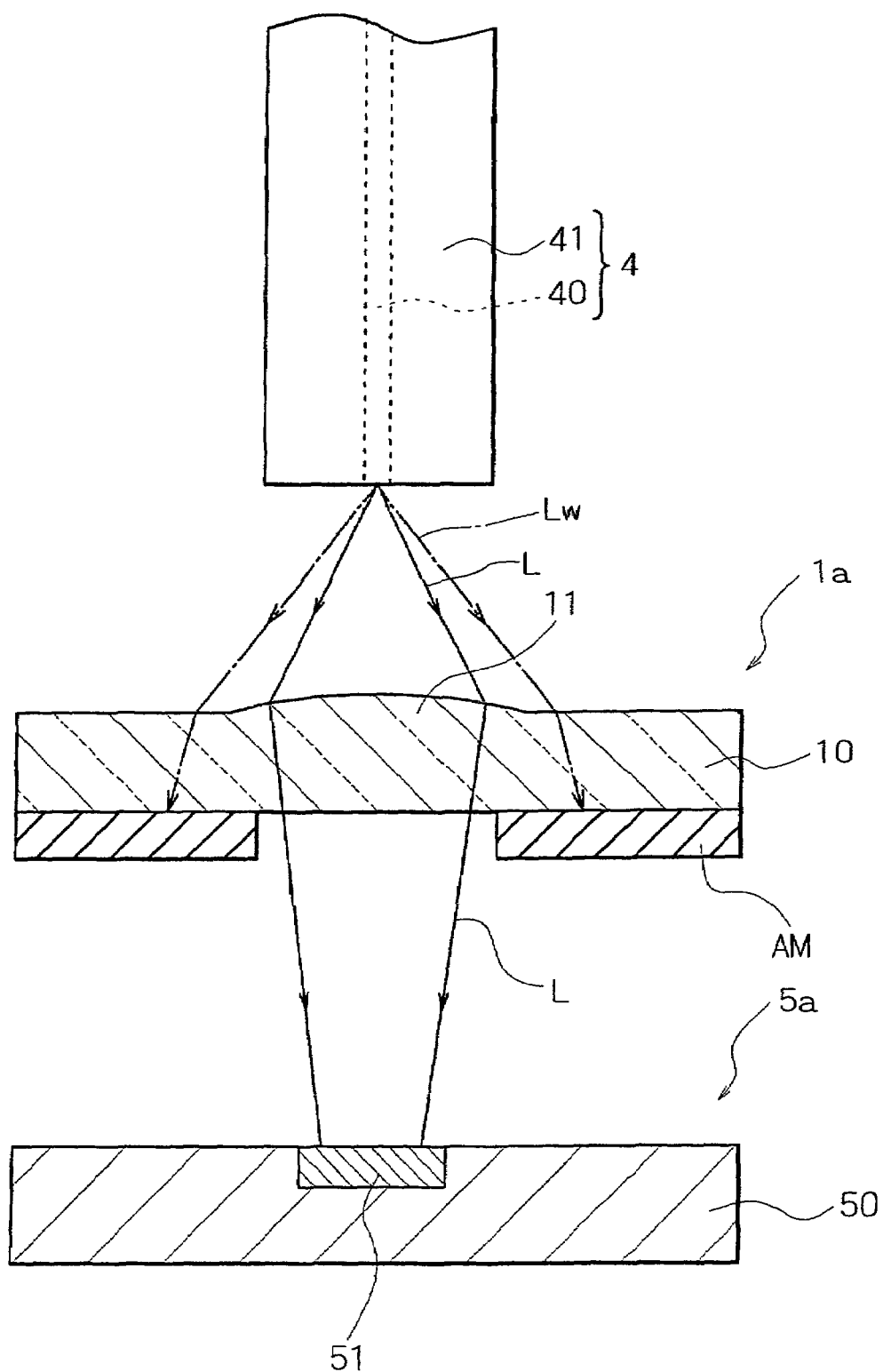
FIG. 19 is a typical view showing a schematic configuration of an optical coupling device according to a fourth related art.
Figure 20:
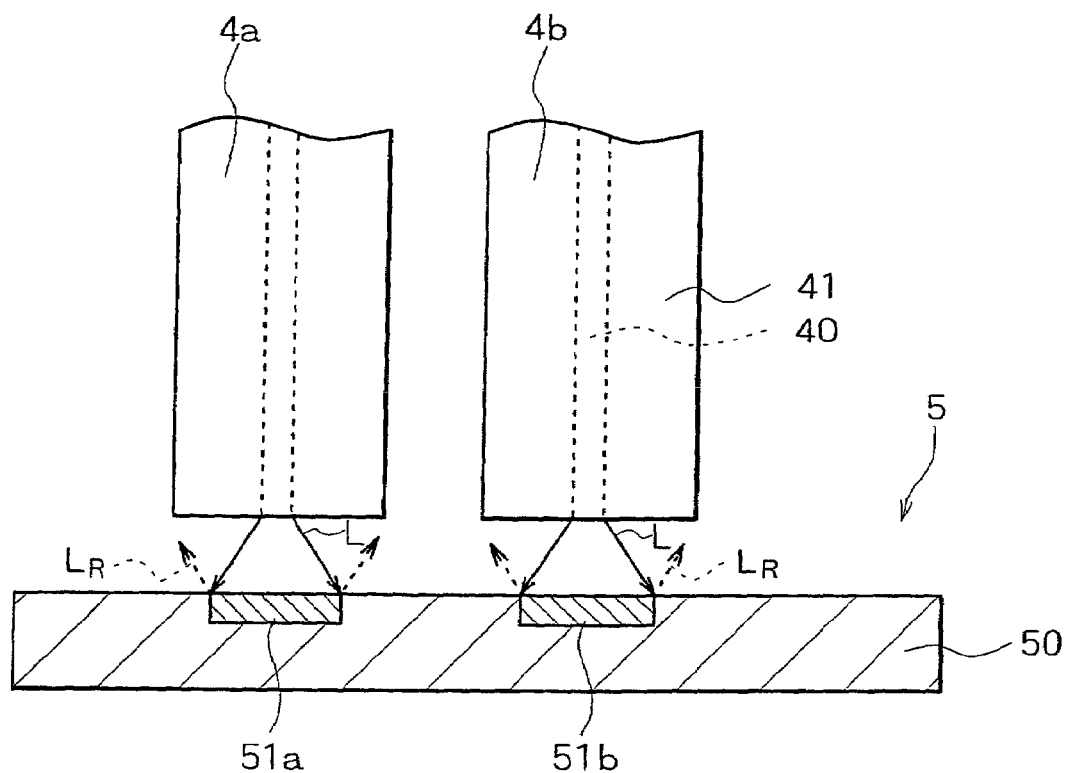
FIG. 20 is a typical view showing a schematic configuration of an optical coupling device according to a fifth related art.

FIGS. 13, 14 and 15 are typical views each illustrating an array of optical fibers according to an eleventh embodiment.

An array pitch of optical lenses has been limited by occurrence of crosstalk and NAs of the optical lenses, and has been determined depending on optical characteristics of the optical lenses and other characteristics such as ease of assembly of the optical lenses. According to the optical coupling device described in each of the first to tenth embodiments, however, the light emitting device, the light receiving device, or the light-emitting/light-receiving device can be produced by exposure and development using a photomask, and also the optical lens array can be produced by exposure and development using photomask.

Accordingly, ease of array of optical fibers can also contribute to simplification of assembly of the optical coupling device. That is to say, easiness in array of optical fibers is effective in reducing the assembling cost of the optical coupling device.

FIG. 13 shows the configuration of the optical coupling device, in which optical fibers are arrayed in line.

Each of the optical fibers 4 shown in the figure includes a core portion 40 and a cladding portion 41 provided around an outer peripheral portion of the core portion 40.

The optical fibers produced in accordance with the same specification have the same outer diameter, and accordingly, if the optical fibers are arrayed in line as shown in FIG. 13, then the core portions 40 as light emergence portions of the optical fibers can be regularly arrayed. As a result, it is possible to regularly, easily array optical lenses, light emitting devices, light receiving devices, and light-emitting/light-receiving devices.

The optical fibers arrayed in line may be further arrayed with their outer peripheral portions being in contact with each other. With this configuration, since the core portions 40 as the light emergence portions of the optical fibers can be more regularly arrayed, it is possible to more regularly, easily array optical lenses, light emitting portions, light receiving portions, and light-emitting/light-receiving portions.

FIGS. 14 and 15 show the configurations of the optical coupling device, in each of which optical fibers are two-dimensionally arrayed.

In the case of easily arraying devices in a two-dimensional manner, for example, in the case of optical coupling between optical fibers and light emitting diodes or plane emission type semiconductor lasers as light emitting devices (third embodiment and fourth embodiment), optical coupling between optical fibers and photodiodes (fifth to seventh embodiments), and optical coupling between optical fibers and light-emitting/light-receiving device array having light emitting diodes or plane emission type semiconductor lasers and photodiodes, the optical fibers can be two-dimensionally arrayed.

The array of the optical fibers shown in each of FIGS. 14 and 15 can be obtained by two-dimensionally developing the array of the optical fibers shown in FIG. 13. By arraying the optical fibers two-dimensionally (in lines), the core portions 40 as the light emergence portions of the optical fibers can be regularly arrayed, so that it is possible to regularly, easily array the optical lenses, light emitting devices, light receiving devices, and light-emitting/light-receiving devices and to enhance the array density.

While the present invention has been described by way of the first to eleventh embodiments, the present invention is not limited thereto.

For example, a material for forming an optical lens and a material for forming a mask layer are not limited to those described in the embodiments. In particular, according to the present invention, any kind of material can be used as the material for forming a mask layer insofar as a boundary between each of a mask layer portion and a substrate is not moved by heat-treatment and the surface of the mask layer portion is rounded by heat-treatment.

In the eighth to tenth embodiments, light emitting diodes are used as the light emitting devices of the light-emitting/light-receiving device array; however, another kind of light emitting devices such as plane emission type semiconductor lasers may be used.

Optical fibers can be used as members on both the light outgoing side and the light incoming side.

In addition to the above changes, various changes may be made without departing from the spirit or scope of the following claims.

What is claimed is:

1. An optical coupling device comprising:
an optical lens array including a lens substrate made from an optical material and having a plurality of convex portions extending therefrom, a convex portion of said plurality of convex portions having a convex shape and comprising a material the same as that of said lens substrate,
said lens substrate having a mask layer on the surface thereof, said mask layer comprising a material different than that of said lens substrate,
a height of said convex portion being specified on the basis of a thickness of said mask layer,
wherein a groove is formed, in said optical lens array, at the boundary between each of said convex shaped optical lens portions and the flat surface of said lens substrate.

2. An optical coupling device according to claim 1, wherein the curvature of said convex portion is specified on the basis of a diameter of said mask layer.

3. An optical coupling device according to claim 1, wherein the curvature of said convex portion is specified on the basis of a thickness of said mask layer.

4. An optical coupling device according to claim 1, wherein said plurality of convex portions are arrayed on said lens substrate.

5. An optical coupling device according to claim 1, wherein said optical material includes quartz or silicon oxide.

6. An optical coupling device according to claim 1, wherein said mask layer is composed of a photoresist.

7. An optical coupling device according to claim 1, wherein a convex portion of said plurality of convex portions is an optical lens portion of a plurality of optical lens portions.

8. An optical coupling device according to claim 1, wherein said mask layer comprises a plurality of mask layer portions.

9. An optical coupling device according to claim 8, wherein a mask layer portion of said plurality of mask layer portions and part of said lens substrate are simultaneously removed.

10. An optical coupling device according to claim 8, wherein a mask layer portion of said plurality of mask layer portions is separate and distinct from another of said plurality of mask layer portions.

11. An optical coupling device according to claim 8, wherein said lens substrate is exposed between said mask layer portion and another of said plurality of mask layer portions.

12. An optical coupling device according to claim 8, wherein a mask layer portion of said plurality of mask layer portions has a curved surface.

13. An optical coupling device according to claim 8, wherein a location of a mask layer portion of said plurality of mask layer portions correspond to a formation region of said convex portion.

14. An optical coupling device according to claim 1, wherein a light absorber having apertures is formed on said lens substrate.

15. An optical coupling device according to claim 1, wherein a groove is formed in said lens substrate between said convex portion and another of said plurality of convex portions.

16. An optical coupling device according to claim 1, further comprising:
a light outgoing member having an array of a plurality of light outgoing portions, a light outgoing portion of said a plurality of light outgoing portions emitting light; and
a light incoming member having a plurality of light incoming portions, a light incoming portion of said a plurality of light incoming portions receiving said light, said light incoming portion corresponding to said light outgoing portion,
wherein said optical lens array includes a plurality of optical lens portions, an optical lens portion of said plurality of optical lens portions corresponding to said light outgoing portion and said light incoming portion.

17. An optical coupling device according to claim 16, wherein said light outgoing member is a light emitting device array having an array of a plurality of light emitting portions.

18. An optical coupling device according to claim 17, wherein said light emitting device array is a light emitting diode array.

19. An optical coupling device according to claim 16, wherein said light incoming member is an array of a plurality of optical fibers.

20. An optical coupling device according to claim 19, wherein said plurality of optical fibers is arrayed in such a manner that outer peripheral portions of adjacent two of said plurality of optical fibers are in contact with each other.

21. An optical coupling device according to claim 16, wherein said light outgoing member is an array of a plurality of optical fibers.

22. An optical coupling device according to claim 16, wherein said light incoming member is a light receiving device array having an array of a plurality of light receiving portions.

23. An optical coupling device according to claim 22, wherein said light receiving device array is formed by arraying said light receiving portions on a light receiving device substrate.

24. An optical coupling device according to claim 22, wherein said optical fibers are arrayed in such a manner that outer peripheral portions thereof are in contact with each other.

25. An optical coupling device according to claim 22, wherein said light receiving device array is a photodiode array.

26. An optical coupling device according to claim 16, wherein part of each of said light incoming member and said light outgoing member is an array of a plurality of optical fibers.

27. An optical coupling device according to claim 25, wherein the rest of said light outgoing member is a light emitting device array having an array of a plurality of light emitting portions, and the rest of said light incoming member is a light receiving device array having an array of a plurality of light receiving portions.

28. An optical coupling device according to claim 25, wherein said light emitting portions of said light emitting device array as the rest of said light outgoing member and said light receiving portions of said light receiving device array as the rest of said light incoming member are arrayed on the same device substrate.

29. An optical coupling device according to claim 25, wherein said optical fibers are arrayed in such a manner that outer peripheral portions thereof are in contact with each other.

30. An optical coupling device comprising:
a light outgoing member having an array of a plurality of light outgoing portions, a light outgoing portion of said a plurality of light outgoing portions emitting light;
a light incoming member having a plurality of light incoming portions, a light incoming portion of said a plurality of light incoming portions receiving said light, said light incoming portion corresponding to said light outgoing portion; and
an optical lens array including a lens substrate made from an optical material and having a plurality of convex portions extending therefrom, a convex portion of said plurality of convex portions having a convex shape and comprising a material the same as that of said lens substrate,
said lens substrate having a mask layer on the surface thereof, said mask layer having a plurality of mask layer portions and comprising a material different than that of said lens substrate, a mask layer portion of said plurality of mask layer portions has a curved surface, a location of said mask layer portion corresponding to a formation region of said convex portion,
said lens substrate being exposed between said mask layer portion and another of said plurality of mask layer portions,
a height and curvature of said convex portion being specified on the basis of a thickness of said mask layer,
wherein a groove is formed, in said optical lens array, at the boundary between each of said convex shaped optical lens portions and the flat surface of said lens substrate.

* * * * *